US008125580B2

(12) United States Patent
Takama et al.

(10) Patent No.: US 8,125,580 B2
(45) Date of Patent: Feb. 28, 2012

(54) LIQUID CRYSTAL DISPLAY APPARATUS

(75) Inventors: Daisuke Takama, Kanagawa (JP); Go Yamanaka, Kanagawa (JP); Ryoichi Ito, Kanagawa (JP); Koji Noguchi, Kanagawa (JP); Masanobu Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 12/430,385

(22) Filed: Apr. 27, 2009

(65) Prior Publication Data
US 2009/0268132 A1 Oct. 29, 2009

(30) Foreign Application Priority Data
Apr. 28, 2008 (JP) ................................. 2008-117460

(51) Int. Cl.
G02F 1/1333 (2006.01)

(52) U.S. Cl. .......... 349/12; 349/106; 349/116; 345/104; 345/175

(58) Field of Classification Search .................. None
See application file for complete search history.

(56) References Cited

U.S. PATENT DOCUMENTS

| 5,151,688 | A | * | 9/1992 | Tanaka et al. | 345/104 |
| 5,585,817 | A | * | 12/1996 | Itoh et al. | 345/104 |
| 2006/0103637 | A1 | | 5/2006 | Yamaguchi et al. | |
| 2006/0192766 | A1 | | 8/2006 | Nakamura et al. | |
| 2006/0244693 | A1 | * | 11/2006 | Yamaguchi et al. | 345/76 |
| 2006/0279690 | A1 | * | 12/2006 | Yu et al. | 349/199 |
| 2007/0120833 | A1 | | 5/2007 | Yamaguchi et al. | |
| 2007/0171319 | A1 | | 7/2007 | Fujita et al. | |
| 2008/0074401 | A1 | * | 3/2008 | Chung et al. | 345/175 |
| 2008/0121442 | A1 | * | 5/2008 | Boer et al. | 178/18.09 |
| 2009/0135167 | A1 | * | 5/2009 | Sakai et al. | 345/207 |
| 2009/0147191 | A1 | * | 6/2009 | Nakajima et al. | 349/116 |
| 2009/0161051 | A1 | * | 6/2009 | Fukunaga et al. | 349/115 |
| 2009/0231511 | A1 | * | 9/2009 | Takahashi et al. | 349/61 |

FOREIGN PATENT DOCUMENTS

| JP | 7-325319 A | * 12/1995 |
| JP | 08-286206 | 11/1996 |
| JP | 2004-264846 | 9/2004 |
| JP | 2004-318819 | 11/2004 |
| JP | 2005-275644 | 10/2005 |
| JP | 2006-127212 | 5/2006 |
| JP | 2006-301864 | 11/2006 |
| JP | 2007-128497 | 5/2007 |
| JP | 2007-226200 | 9/2007 |
| JP | 2008-083675 | 4/2008 |

OTHER PUBLICATIONS

Japanese Patent Office Action corresponding to Japanese Serial No. 2008-117460 dated Jul. 27, 2010.

\* cited by examiner

*Primary Examiner* — Mike Stahl
(74) *Attorney, Agent, or Firm* — SNR Denton US LLP

(57) ABSTRACT

Disclosed herein is a liquid crystal display apparatus, including: a liquid crystal panel having a pixel region in which first and second electrodes apply an electric field to a liquid crystal layer to display an image; the liquid crystal panel including a photo-sensor element having a light receiving face at which the photo-sensor element receives incident light through the liquid crystal layer in the pixel region to produce received light data; at least one of the first and second electrodes being formed in a region of the pixel region other than a light receiving face corresponding region of the pixel region which corresponds to the light receiving face of the photo-sensor element.

13 Claims, 30 Drawing Sheets

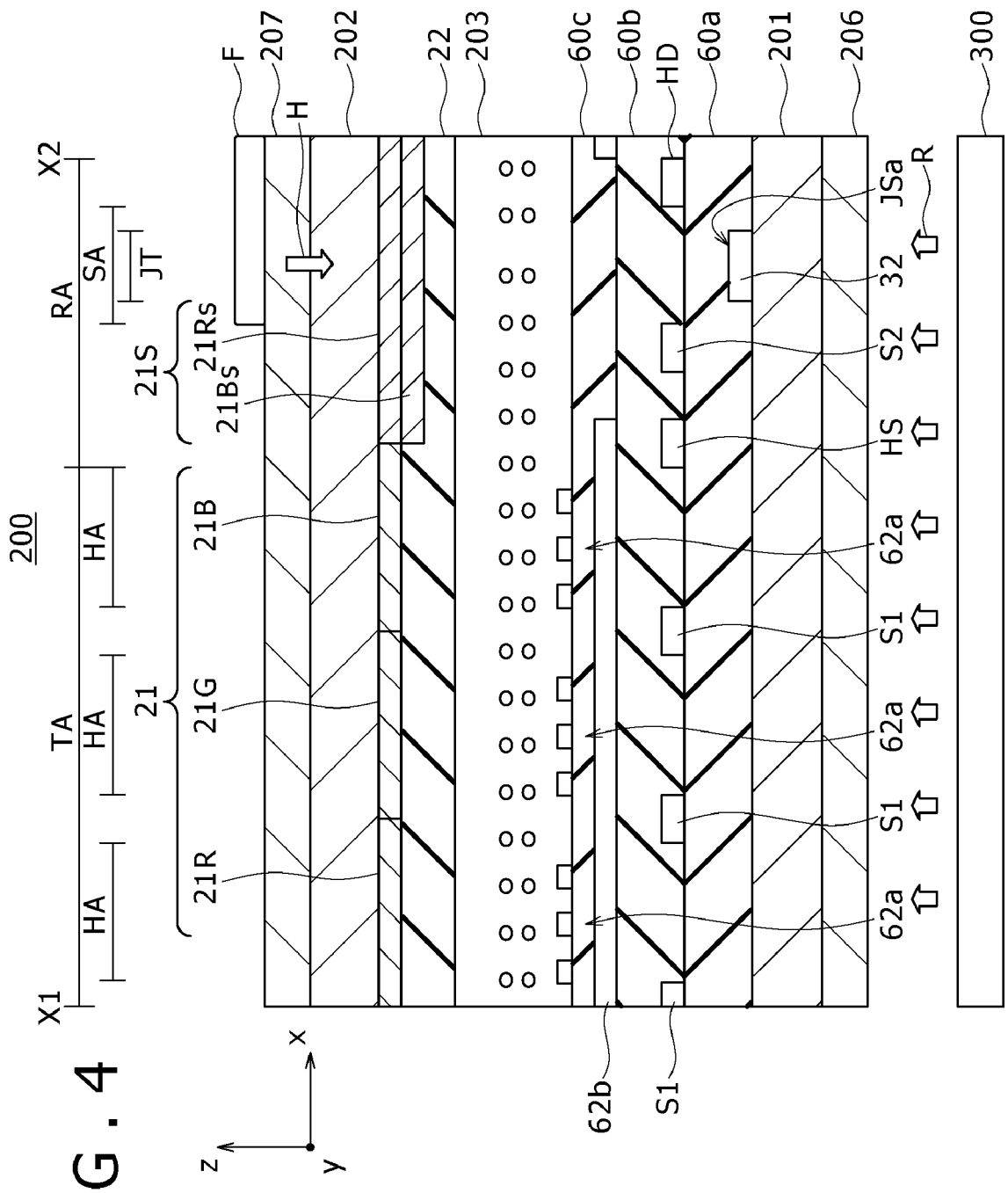

LIQUID CRYSTAL DISPLAY APPARATUS

BACKGROUND OF THE INVENTION

1. Field of the Invention

This invention relates to a liquid crystal display apparatus, and more particularly to a liquid crystal display apparatus wherein a photo-sensor element is provided in a pixel region of a liquid crystal panel and receives, at a light receiving face thereof, light incident thereto through a liquid crystal layer to produce received light data.

2. Description of the Related Art

A liquid crystal display apparatus includes, as a display panel, a liquid crystal panel wherein a liquid crystal layer is enclosed between a pair of substrates. The liquid crystal panel is formed, for example, as a transmission type liquid crystal panel which modulates and transmits therethrough illuminating light emitted from an illuminating apparatus such as a backlight provided on the rear face of the liquid crystal panel. An image is formed from the modulated illuminating light on the front face of the liquid crystal panel.

The liquid crystal panel is formed, for example, as an active matrix type liquid crystal panel which includes a TFT (thin film transistor) array substrate wherein a plurality of thin film transistors each functioning as a pixel switching element are formed in each pixel region. In the liquid crystal panel, an opposing substrate is disposed in an opposing relationship to the TFT array substrate, and a liquid crystal layer is provided between the TFT array substrate and the opposing substrate.

In the liquid crystal panel of the active matrix type, an electric field generated between a pixel electrode and a common electrode when each pixel switching element inputs a potential to the pixel electrode is applied to the liquid crystal layer to vary the orientation of liquid crystal molecules of the liquid crystal layer. As a result, the transmittance of light transmitted through the pixel is controlled to modulate the light transmitted through the pixel to carry out display of an image.

As regards such a liquid crystal panel as described above, such display modes as a TN (Twisted Nematic) mode, an ECB (Electrically Controlled Birefringence) mode and a vertical orientation mode are known. In addition, as modes wherein a transverse electric field is applied to the liquid crystal layer, various modes such as an IPS (In-Plane Switching) mode and an FFS (Fringe Field Switching) mode are known. Such modes as mentioned above are described, for example, in Japanese Patent Laid-Open No. 2007-226200.

Meanwhile, as such a liquid crystal panel as described above, a liquid crystal panel has been proposed which includes, in addition to a semiconductor element such as a TFT which functions as a pixel switching element, a photo-sensor element built in a pixel region and capable of receiving light to produce received light data. A liquid crystal panel of the type just described is disclosed, for example, in Japanese Patent Laid-Open No. 2006-127212 and Japanese Patent Laid-Open No. 2007-128497.

The liquid crystal panel described can implement a function as a user interface by utilizing the built-in photo-sensor element as a position sensor element. Therefore, the liquid crystal panel is called I/O touch panel.

In a liquid crystal panel of the type described, it is not necessary to dispose a separate touch panel of the resistance film type or the electrostatic capacity type on the front face of the liquid crystal panel. Accordingly, reduction in size and thickness of an apparatus can be implemented readily. Further, where a touch panel of the resistance film type or the electrostatic capacity type is used, since the touch panel sometimes decreases the amount of light to be transmitted through the liquid crystal panel in a pixel region or gives rise to interference of light, the quality of the display image is sometimes deteriorated. However, where a photo-sensor element is built as a position sensor element in a liquid crystal panel, occurrence of such a fault as just described can be prevented.

In the liquid crystal panel, visible rays reflected from a detection object body such as a finger of a user or a touch pen which contacts with the front face of the liquid crystal panel are received by a photo-sensor element built in as the position sensor element. Thereafter, the position at which the detection object body contacts is specified based on received light data obtained by the photo-sensor element built in as the position sensor element. Then, an operation corresponding to the specified position is carried out by the liquid crystal display apparatus itself or an electronic apparatus which includes the liquid crystal display apparatus.

Where the position of the detection object body is detected using the photo-sensor element built in as the position sensor element in such a manner as described above, the received light data obtained by the photo-sensor element sometimes includes much noise from an influence of visible rays included in external light. Further, where black display is carried out in a pixel region, it is difficult for the photo-sensor element provided on the TFT array substrate to receive visible rays. Therefore, it is sometimes difficult to accurately detect the position of the detection object body.

A display apparatus has been proposed which uses invisible rays such as infrared rays in place of visible rays in order to eliminate such a fault as described above. The display apparatus of the type is disclosed, for example, in Japanese Patent Laid-Open No. 2004-318819 or Japanese Patent Laid-Open No. 2005-275644.

In the display apparatus mentioned, invisible rays such as infrared rays emitted from a detection object body are received by a photo-sensor element built in as a position sensor element to acquire received light data. Then, the position of the detection object body is specified based on the acquired data.

SUMMARY OF THE INVENTION

However, it is sometimes difficult to obtain data of a sufficiently high S/N (signal to noise) ratio because received light data obtained by the photo-sensor element includes noise. For example, where coupling occurs between electrodes which apply an electric field to the liquid crystal layer and the photo-sensor element, much noise is sometimes included in the received light data, resulting in a drop of the S/N ratio. Consequently, it is sometimes difficult to precisely detect the position of the detection object body.

Particularly where the FFS mode is employed as the display mode, both of the pixel electrode and the common electrode are provided on the TFT array substrate, and an insulating film is formed as a lower layer of the pixel electrode and the common electrode is formed in a lower layer of the insulating film. Therefore, since the common electrode is provided in the proximity of the photo-sensor element, coupling is likely to occur between the common electrode and the photo-sensor element, which gives rise to such a fault as described above.

Therefore, it is desirable to provide a liquid crystal display apparatus which can improve the S/N ratio of received light data obtained from a photo-sensor element.

According to the present invention, there is provided a liquid crystal display apparatus, including: a liquid crystal panel having a pixel region in which first and second electrodes apply an electric field to a liquid crystal layer to display an image; the liquid crystal panel including a photo-sensor element having a light receiving face at which the photo-sensor element receives incident light through the liquid crystal layer in the pixel region to produce received light data; at least one of the first and second electrodes being formed in a region of the pixel region other than a light receiving face corresponding region of the pixel region which corresponds to the light receiving face of the photo-sensor element.

Preferably, at least one of the first and second electrodes includes the light receiving face corresponding region and is not formed in a first region greater than the light receiving face corresponding region but formed in any other region than the first region.

Preferably, the liquid crystal panel includes a filter layer provided in each of the pixel regions in such a manner as to transmit therethrough an amount of invisible rays greater than the amount of visible rays from within the light incident to the light receiving face of the photo-sensor element.

Preferably, the filter layer includes the first region and is disposed so as to cover a second region greater than the first region.

Preferably, the filter layer is formed so as to transmit therethrough infrared rays as the invisible rays.

Preferably, the filter layer is a color filter laminate wherein at least two of a red filter layer, a green filter layer, a blue filter layer, a yellowish green filter layer and an emerald green filter layer are laminated.

Preferably, the liquid crystal display apparatus further includes a position detection section configured to detect the position of a detection object body positioned adjacent one face of the liquid crystal panel; the pixel region including a plurality of photo-sensor elements disposed therein in such a manner as to receive light advancing from the one face side toward the other face side of the liquid crystal panel; the position detection section detecting the position of the detection object body based on the received light data produced by the plural photo-sensor elements.

Preferably, the liquid crystal display apparatus further includes: an illuminating section configured to emit illuminating light toward the other face side of the liquid crystal panel; the liquid crystal panel being configured such that the illuminating light emitted from the illuminating section is transmitted from the other face side to the one face side of the liquid crystal panel so that an image is displayed in the pixel region using the transmitted light; the photo-sensor element receiving reflected light when the illuminating light emitted from the illuminating section and transmitted through the liquid crystal panel is reflected by the detection object body positioned on the one face side of the liquid crystal panel.

Preferably, the illuminating section emits visible rays and invisible rays as the illuminating light.

Preferably, the liquid crystal panel includes: a first substrate positioned on the other face side of the liquid crystal panel; and a second substrate positioned on the one face side of the liquid crystal panel and disposed in a spaced relationship from and in an opposing relationship to the first substrate in such a manner as to cooperate with the first substrate to sandwich the liquid crystal layer therebetween; the filter layer being provided on the second substrate.

Preferably, the liquid crystal layer includes liquid crystal molecules oriented in a horizontal direction along a plane along which the first and second substrates are opposed to each other; the first and second electrodes being provided on the first substrate so as to apply a transverse electric field to the liquid crystal layer.

Preferably, the liquid crystal panel is configured such that the pixel region includes a plurality of pixels disposed therein and further includes a plurality of pixel switching elements disposed on the first substrate so as to correspond to the plural pixels in the pixel region for individually driving the plural pixels; the first electrode being a pixel electrode connected to each of the pixel switching elements and provided in the pixel region so as to correspond to each of the plural pixels; the second electrode being provided as a common electrode common to the plural first electrodes in the pixel region.

Preferably, the first substrate includes an insulating film interposed between the first and second electrodes; the second electrode being formed in such a manner as to cover a region of the pixel region other than the first region without being formed in the first region; the insulating film being formed adjacent the liquid crystal layer with respect to the second electrode; the first electrode being formed in a region of the pixel region other than the first region adjacent the liquid crystal layer with respect to the insulating film without being formed in the first region.

Preferably, the first electrode is provided on the first substrate while the second electrode is provided on the second substrate.

Preferably, the liquid crystal panel is configured such that the pixel region includes a plurality of pixels disposed therein and further includes a plurality of pixel switching elements disposed on the first substrate so as to correspond to the plural pixels in the pixel region for individually driving the plural pixels; the first electrode being a pixel electrode connected to each of the pixel switching elements and provided in the pixel region so as to correspond to each of the plural electrodes; the second electrode being provided as a common electrode common to the plural electrodes in the pixel region.

In the liquid crystal display apparatus, at least one of the first and second electrodes for applying an electric field to the liquid crystal layer are formed in a region of the pixel region other than the light receiving face corresponding region which corresponds to the light receiving face of the photo-sensor element but are not formed in the light receiving face corresponding region. Therefore, occurrence of electric coupling between at least one of the first and second electrodes and the photo-sensor element can be prevented.

With the liquid crystal display apparatus, the S/N ratio of received light data obtained by the photo-sensor element can be improved.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a cross sectional view schematically showing part of pixels provided in the pixel region of the liquid crystal panel of FIG. 2;

DETAILED DESCRIPTION OF THE PREFERRED EMBODIMENTS

Embodiment 1

Configuration of the Liquid Crystal Display Apparatus

Figure 1:
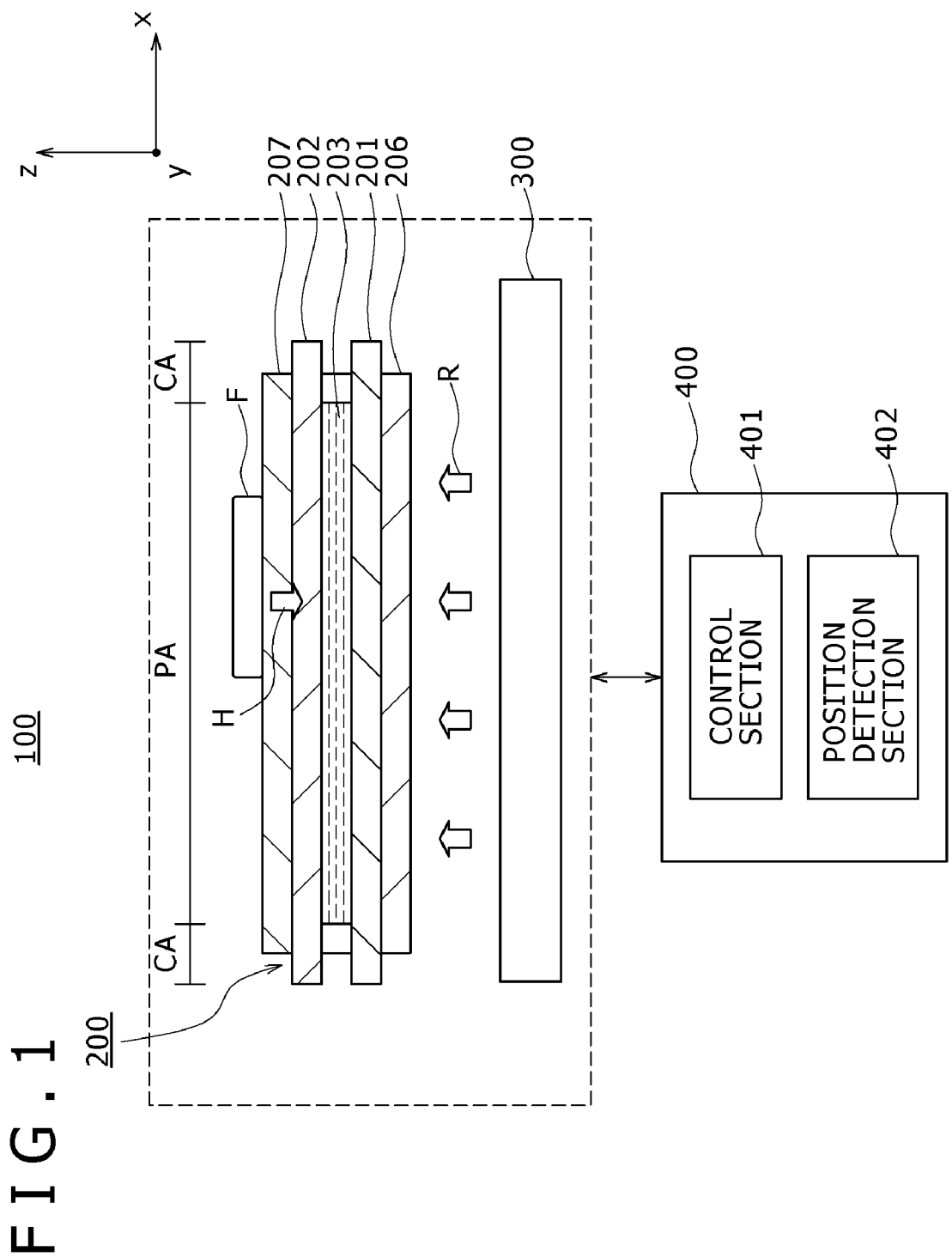
FIG. 1 is a schematic cross sectional view showing a configuration of a liquid crystal display apparatus according to an embodiment 1 of the present invention.

FIG. 1 is a sectional view showing a configuration of a liquid crystal display apparatus 100 according to an embodiment 1 of the present invention.

Referring to FIG. 1, the liquid crystal display apparatus 100 shown includes a liquid crystal panel 200, a backlight 300, and a data processing unit 400. The components are described below successively.

The liquid crystal panel 200 is of the active matrix type and includes a TFT array substrate 201, an opposing substrate 202, and a liquid crystal layer 203.

In the liquid crystal panel 200, the TFT array substrate 201 and the opposing substrate 202 are opposed to each other in a spaced relationship from each other. The liquid crystal layer 203 is provided in a sandwiched state between the TFT array substrate 201 and the opposing substrate 202.

The backlight 300 is disposed adjacent the TFT array substrate 201 of the liquid crystal panel 200 as seen in FIG. 1. The liquid crystal panel 200 receives, at a face thereof opposite to the face of the TFT array substrate 201 which opposes to the opposing substrate 202, illuminating light emitted from the backlight 300.

The liquid crystal panel 200 has a pixel region PA which has a plurality of pixels (not shown) disposed thereon for displaying an image. The liquid crystal panel 200 receives, at the rear face thereof, illuminating light R emitted from the backlight 300 disposed on the back face side thereof through a first polarizing plate 206 and modulates the received illuminating light R in the pixel region PA.

The TFT array substrate 201 has a plurality of image display elements (not shown) provided in a corresponding relationship to the pixels such that pixel switching elements (not shown) which individually compose the image pixel elements control switching of the pixels to modulate the illuminating light received at the rear face of the liquid crystal panel 200. Then, the modulated illuminating light R is emitted to the front face side through a second polarizing plate 207 thereby to display an image in the pixel region PA. In short, the liquid crystal panel 200 is of the transmission type and displays a color image on the front face side thereof.

In the present embodiment, the components of the liquid crystal display apparatus 100 are formed so that the liquid crystal display apparatus 100 may be of the normally black type. In particular, the components of the liquid crystal panel 200 are configured so that, when no voltage is applied to the liquid crystal layer 203, then the light transmittance of the liquid crystal layer 203 drops to cause the liquid crystal panel 200 to carry out black display, but when a voltage is applied to the liquid crystal layer 203, the light transmittance increases.

Although details are hereinafter described, when the liquid crystal panel 200 is in use, a detection object body F such as a finger of a user or a touch pen is brought into contact with or positioned in the proximity of the front face of the liquid crystal panel 200 remote from the rear face adjacent to the backlight 300 is disposed. The liquid crystal panel 200 includes a photo-sensor element (not shown) provided thereon for receiving reflected light H reflected from the detection object body F to produce received light data. The photo-sensor element is formed, for example, in such a manner as to include a photodiode (not shown). The photodiode receives the reflected light H reflected from the detection object body F such as a finger on the front face side of the liquid crystal panel 200. In other words, the photodiode receives the reflected light H directed from the opposing substrate 202 side toward the TFT array substrate 201 side. The photo-sensor element thus photoelectrically converts the reflected light H to produce received light data.

The backlight 300 is opposed to the rear face of the liquid crystal panel 200 and emits illuminating light R to the pixel region PA of the liquid crystal panel 200.

In particular, the backlight 300 is disposed such that it is positioned adjacent the TFT array substrate 201 from between the TFT array substrate 201 and the opposing substrate 202 which compose the liquid crystal panel 200. The backlight 300 irradiates the illuminating light R toward the face of the TFT array substrate 201 remote from the face which is opposed to the opposing substrate 202. In other words, the backlight 300 illuminates the illuminating light R in such a manner as to advance from the TFT array substrate 201 side toward the opposing substrate 202 side.

The data processing unit 400 includes a control section 401 and a position detection section 402. The data processing unit 400 includes a computer which operates as various elements in accordance with a program.

The control section 401 of the data processing unit 400 controls operation of the liquid crystal panel 200 and the backlight 300. The control section 401 supplies a control signal to the liquid crystal panel 200 based on a driving signal supplied thereto from the outside to control operation of the pixel switching elements (not shown) provided on the liquid crystal panel 200. For example, the control section 401 causes the liquid crystal panel 200 to execute line-sequential driving. Further, the control section 401 supplies a control signal to the backlight 300 in response to a driving signal supplied thereto from the outside to control operation of the backlight 300 so that the backlight 300 illuminates the illuminating light R. The control section 401 controls operation of the liquid crystal panel 200 and the backlight 300 to display an image in the pixel region PA of the liquid crystal panel 200.

Further, the control section 401 supplies a control signal to the liquid crystal panel 200 in response to a driving signal supplied thereto from the outside to control operation of the photo-sensor elements (not shown) provided as position sensor elements to collect received light data from the photo-sensor elements. For example, the control section 401 causes line-sequential driving to be executed to collect received light data.

The position detection section 402 of the data processing unit 400 detects the position in the pixel region PA on the front face of the liquid crystal panel 200 at which the detection object body F such as a finger of a user or a touch pen is brought into contact with or positioned in the proximity of the liquid crystal panel 200. Here, the position detection section 402 detects the positioned based on received light data collected from the photo-sensor elements (not shown) provided on the liquid crystal panel 200. For example, a coordinate position at which the signal intensity of the received light data is higher than a reference value is detected as a coordinate position at which the detection object body F contacts with the liquid crystal panel 200 in the pixel region PA.

Configuration of the Liquid Crystal Panel

A general configuration of the liquid crystal panel 200 is described.

Figure 2:
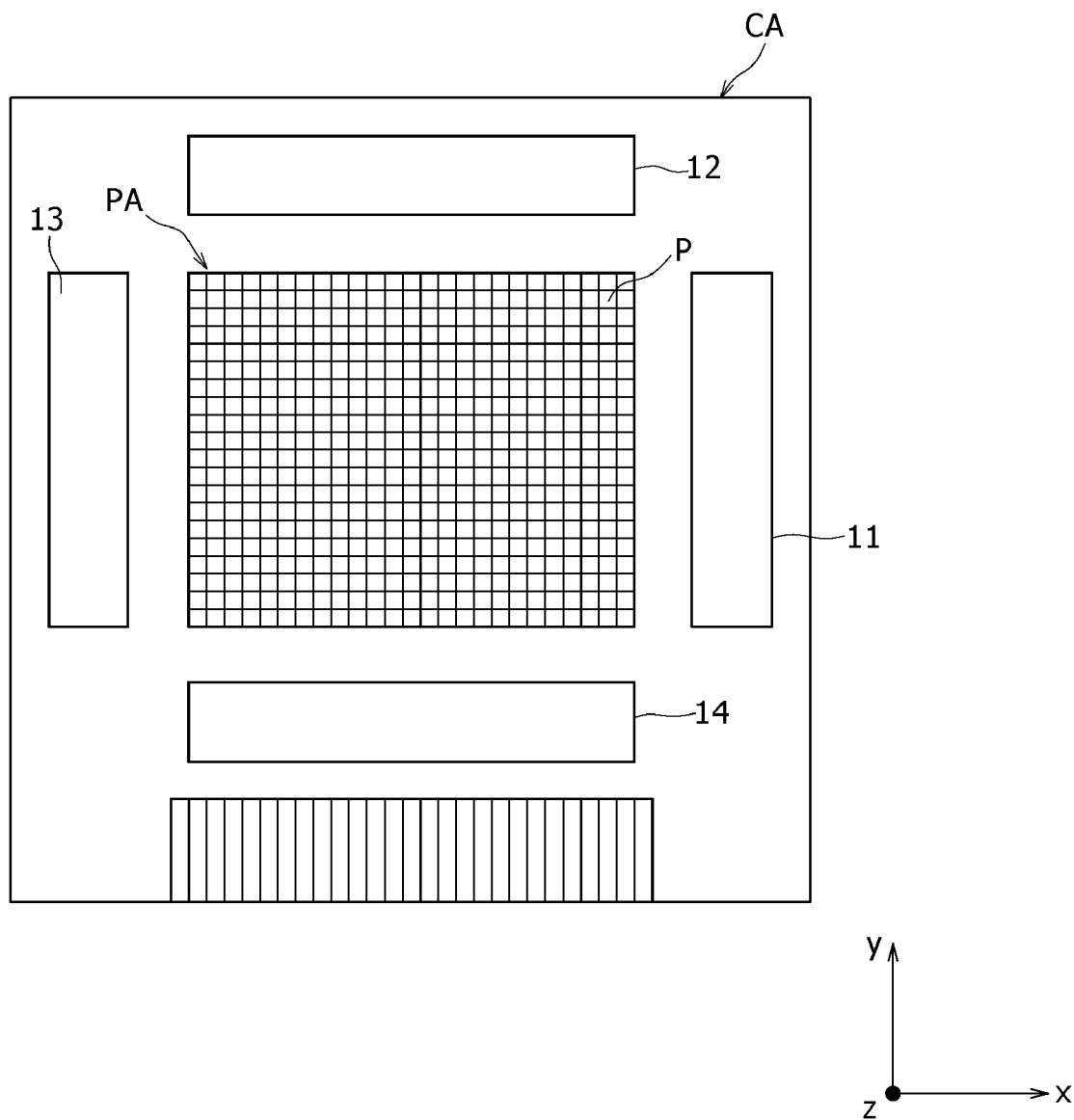
FIG. 2 is a schematic plan view showing a liquid crystal panel of the liquid crystal display apparatus of FIG. 1.
Figure 3A:
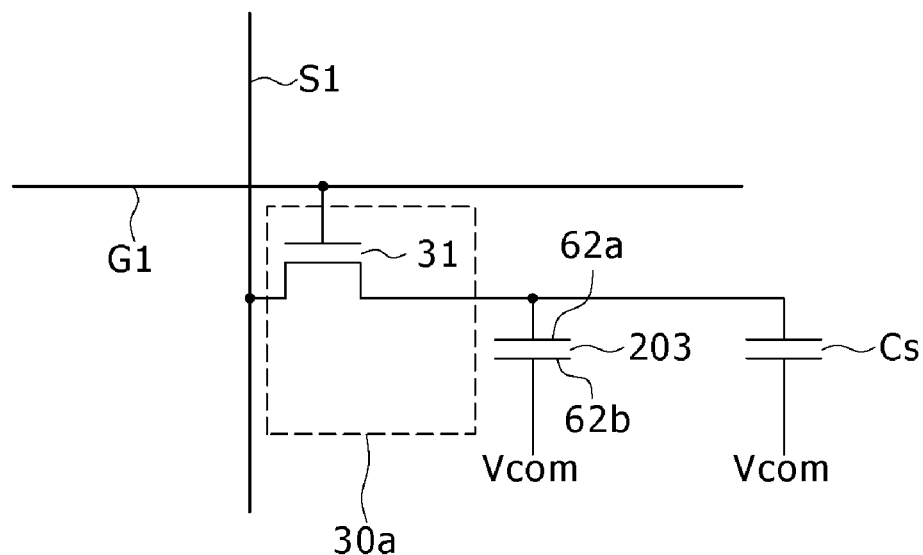
FIGS. 3A and 3B are circuit diagrams showing pixels formed in a pixel region of the liquid crystal panel of FIG. 2.
Figure 3B:
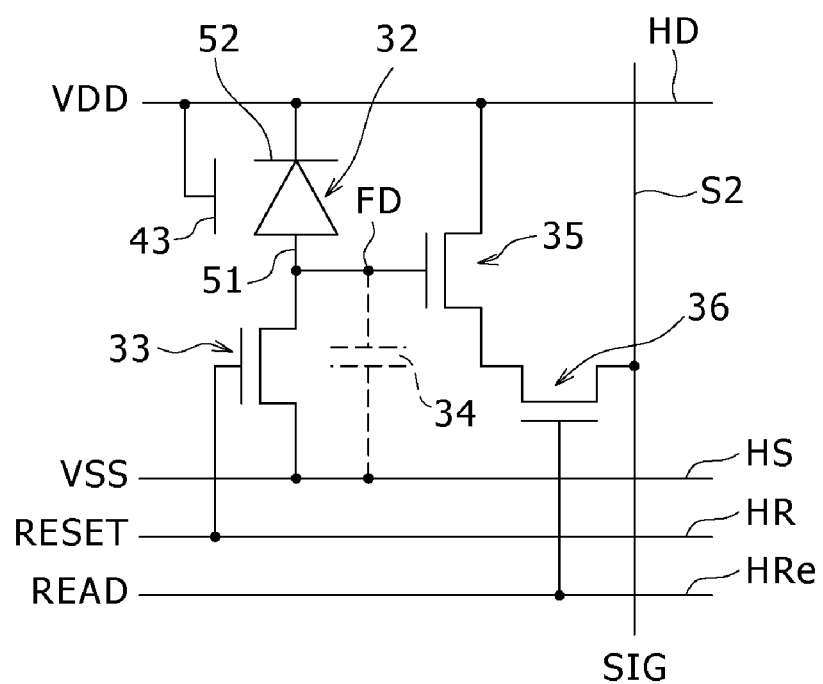

FIG. 2 is a plan view showing the liquid crystal panel 200 according to the embodiment 1 of the present invention. Meanwhile, FIGS. 3A and 3B are circuit diagrams showing an image display element 30a and a photo-sensor element 30b of a pixel formed in the pixel region PA of the liquid crystal panel 200, respectively.

Referring first to FIG. 2, the liquid crystal panel 200 has a pixel region PA and a peripheral region CA.

In the pixel region PA of the liquid crystal panel 200, a plurality of pixels P are disposed in such a manner as seen in FIG. 2 in the plane of the pixel region PA. In particular, in the pixel region PA, a plurality of pixels P are disposed in an x direction and a y direction perpendicular to the x direction, that is, in a matrix, to form an image. Each of the pixels P includes an image display element 30a and a photo-sensor element 30b as seen FIGS. 3A and 3B.

The peripheral region CA of the liquid crystal panel 200 is positioned in such a manner as to surround the pixel region PA as seen in FIG. 2. In the peripheral region CA, a displaying vertical driving circuit 11, a displaying horizontal driving circuit 12, a sensor vertical driving circuit 13 and a sensor horizontal driving circuit 14 are formed as seen in FIG. 2. Each of the circuits mentioned are composed of semiconductor elements formed similarly to the image display element 30a and the photo-sensor element 30b described above.

The image display elements 30a formed in the corresponding relationship to the pixels P in the pixel region PA are driven by the displaying vertical driving circuit 11 and the displaying horizontal driving circuit 12 to execute image display. Together with this, the photo-sensor elements 30b formed in a corresponding relationship to the pixels P in the pixel region PA are driven by the sensor vertical driving circuit 13 and the sensor horizontal driving circuit 14 to collect received light data.

The displaying vertical driving circuit 11 is provided in the peripheral region CA as seen in FIG. 2. The displaying vertical driving circuit 11 is electrically connected to a gate line G1 extending in the x direction as shown in FIG. 3A. Here, the displaying vertical driving circuit 11 is electrically connected to a plurality of gate lines G1 juxtaposed with each other in the y direction. Then, the displaying vertical driving circuit 11 successively supplies a selection pulse to the gate lines G1 juxtaposed in the y direction based on a control signal supplied thereto.

The displaying horizontal driving circuit 12 is provided in the peripheral region CA in such a manner as seen in FIG. 2. The displaying horizontal driving circuit 12 is electrically connected to a first data line S1 extending in the y direction as seen in FIG. 3A. Here, the displaying horizontal driving circuit 12 is electrically connected to a plurality of first data lines S1 juxtaposed with each other in the x direction. The displaying horizontal driving circuit 12 successively supplies an image signal to the first data lines S1 juxtaposed in the x direction based on a control signal supplied thereto.

The sensor vertical driving circuit 13 is provided in the peripheral region CA as seen in FIG. 2. The sensor vertical driving circuit 13 is electrically connected to a read line Read extending in the x direction as shown in FIG. 3B. Here, the sensor vertical driving circuit 13 is electrically connected to a plurality of read lines Read juxtaposed with each other in the y direction. The sensor vertical driving circuit 13 successively supplies a selection pulse to the read lines Read juxtaposed in the y direction based on a control signal supplied thereto.

The sensor horizontal driving circuit 14 is provided in the peripheral region CA as seen in FIG. 2. The sensor horizontal driving circuit 14 is electrically connected to a second data line S2 extending in the y direction as shown in FIG. 3B. Here, the sensor horizontal driving circuit 14 is electrically connected to a plurality of second data lines S2 juxtaposed with each other in the x direction. The sensor horizontal driving circuit 14 successively reads out received light data outputted from the photo-sensor element 30b through the second data lines S2 juxtaposed in the x direction based on a control signal supplied thereto.

Referring to FIG. 3A, the image display element 30*a* includes a pixel switching element 31 and an auxiliary capacitance element Cs as seen in FIG. 3A.

In the image display element 30*a*, the pixel switching element 31 and the auxiliary capacitance element Cs are provided in the proximity of an intersecting point between a first data line S1 extending in the y direction and a gate line G1 extending in the x direction as seen in FIG. 3A.

The pixel switching element 31 may be, for example, a thin film transistor and is connected at the gate thereof to the gate line G1, at the source electrode thereof to the first data line S1 and at the drain electrode thereof to the auxiliary capacitance element Cs and the liquid crystal layer 203.

The auxiliary capacitance element Cs is a capacitor having an electrode to which a common potential Vcom is applied and another electrode connected to the drain electrode of the pixel switching element 31.

In the image display elements 30*a*, the pixel switching elements 31 are line-sequentially driven by the displaying vertical driving circuit 11 and the displaying horizontal driving circuit 12 based on a control signal supplied thereto from the control section 401 to carry out image display.

In particular, referring to FIGS. 2 and 3A, a selection pulse is supplied from the displaying vertical driving circuit 11 to the gate of the pixel switching element 31 through the gate line G1 to place the pixel switching element 31 into an on state. At this time, as an image signal is supplied from the displaying horizontal driving circuit 12 to the first data line S1, the pixel switching element 31 writes the image signal into the liquid crystal layer 203. Consequently, a potential corresponding to the image signal is applied to a pixel electrode 62*a*, and therefore, a voltage is applied to the liquid crystal layer 203 to execute image display.

Referring to FIG. 3B, the photo-sensor element 30*b* includes a light receiving element 32, a reset transistor 33, an amplifying transistor 35 and a selection transistor 36 as seen in FIG. 3B.

The light receiving element 32 is a photodiode and includes a control electrode 43, an anode electrode 51 and a cathode electrode 52. The control electrode 43 is connected to a power supply voltage line HD and receives a power supply voltage VDD supplied thereto. The anode electrode 51 is connected to a floating diffusion FD. The cathode electrode 52 is connected to the power supply voltage line HD and receives the power supply voltage VDD supplied thereto.

The reset transistor 33 is connected at one of terminals thereof to a reference voltage line HS and receives a reference voltage VSS supplied thereto. Further, the reset transistor 33 is connected at another terminal thereof to the floating diffusion FD. Meanwhile, the reset transistor 33 is connected at the gate electrode thereof to a reset signal line HR such that, when a reset signal is supplied through the reset signal line HR, the reset transistor 33 resets the potential of the floating diffusion FD.

The amplifying transistor 35 is connected at one of terminals thereof to the power supply voltage line HD and receives the power supply voltage VDD supplied thereto. Further, the amplifying transistor 35 is connected at the other terminal thereof to the selection transistor 36. Meanwhile, the amplifying transistor 35 is connected at the gate electrode thereof to the floating diffusion FD.

The selection transistor 36 is connected at one of terminals thereof to the amplifying transistor 35 and at another one of the terminals thereof to the second data line S2. The selection transistor 36 is connected at the gate electrode thereof to a read line HRe and receives a read signal (Read) supplied thereto. If the read signal is supplied to the gate electrode of the selection transistor 36, then the selection transistor 36 is placed into an on state, in which the selection transistor 36 outputs received light data amplified by the amplifying transistor 35 to the second data line S2.

Here, electrostatic capacitance 34 is produced between the floating diffusion FD and the reference voltage line HS to which the reference voltage VSS is supplied, and the voltage of the floating diffusion FD varies in response to the amount of charge accumulated in the electrostatic capacitance 34.

The photo-sensor element 30*b* is driven by the sensor vertical driving circuit 13 and the sensor horizontal driving circuit 14 to produce received light data, and the thus produced received light data is read out. Here, for example, the sensor vertical driving circuit 13 supplies a reset signal (Reset) through the reset signal line HR. Thereafter, the potential which fluctuates in the floating diffusion FD in response to charge produced when the light receiving element 32 receives and photoelectrically converts light is amplified by the amplifying transistor 35. Then, the sensor horizontal driving circuit 14 supplies a read signal to the gate of the selection transistor 36, and the sensor horizontal driving circuit 14 reads out the potential as received light data through the second data line S2. Then, the received light data is outputted to the position detection section 402.

Configuration of the Pixel Region of the Liquid Crystal Panel

FIG. 4 is a sectional view schematically showing part of a pixel P provided in the pixel region PA of the liquid crystal panel 200 in the embodiment 1 according to the present invention.

Referring to FIG. 4, the liquid crystal panel 200 includes a TFT array substrate 201, an opposing substrate and a liquid crystal layer 203.

In the present liquid crystal panel 200, the TFT array substrate 201 and the opposing substrate 202 are adhered to each other in a spaced relationship from each other as seen in FIG. 4, and the liquid crystal layer 203 is provided in a gap between the TFT array substrate 201 and the opposing substrate 202. For example, a spacer (not shown) is interposed between the TFT array substrate and the opposing substrate 202 to provide the gap such that the TFT array substrate 201 and the opposing substrate 202 are spaced from each other in an opposing relationship to each other. The TFT array substrate 201 and the opposing substrate 202 are adhered to each other using a seal member (not shown).

In the present embodiment, the liquid crystal panel is provided so as to be ready for a display mode of the FFS system.

In the liquid crystal panel 200, the TFT array substrate 201 is a substrate of an insulating material which transmits light therethrough and is formed, for example, from glass. Further, on the face of the TFT array substrate 201 which opposes to the opposing substrate 202, light receiving elements 32, pixel electrodes 62*a*, common electrodes 62*b*, first data lines S1, second data lines S2, power supply voltage lines HD and reference voltage lines HS are formed as seen in FIG. 4. Further, though not shown in FIG. 4, pixel switching elements 31, gate lines G1, reset transistors 33, amplification transistors 35, selection transistors 36, reset signal lines HR and read lines HRe are provided on the members described above.

In the liquid crystal panel 200, the opposing substrate 202 is a substrate of an insulating material which transmits light therethrough similarly to the TFT array substrate 201 and is formed, for example, from glass. The opposing substrate 202 is opposed in a spaced relationship to the TFT array substrate 201 as seen in FIG. 4. On the face of the opposing substrate 202 opposing to the TFT array substrate 201, a color filter layer 21 and a visible ray cut filter layer 21S are formed as seen in FIG. 4. The color filter layer 21 includes a red filter layer 21R, a green filter layer 21G and a blue filter layer 21B for the three primary colors of red, green and blue.

In the liquid crystal panel 200, the liquid crystal layer 203 is sandwiched between the TFT array substrate 201 and the opposing substrate 202 as seen in FIG. 4. The liquid crystal layer 203 is oriented by liquid crystal orientation films (not shown) formed on the opposing faces of the TFT array substrate 201 and the opposing substrate 202. In the present embodiment, liquid crystal molecules in the liquid crystal layer 203 are oriented horizontally. In other words, the liquid crystal layer 203 is oriented such that the longitudinal direction of the liquid crystal molecules extends in the direction of the xy plane in which the TFT array substrate 201 and the opposing substrate 202 are opposed to each other.

In the liquid crystal panel 200, the pixel P is partitioned into a display region TA and a sensor region RA in a plane in which the TFT array substrate 201 and the opposing substrate 202 are opposed to each other.

In the display region TA of the liquid crystal panel 200, a color filter layer 21, a pixel switching element 31 (FIG. 5), pixel electrodes 62a, a common electrode 62b and first data lines S1 are formed as seen in FIG. 4.

Figure 5:
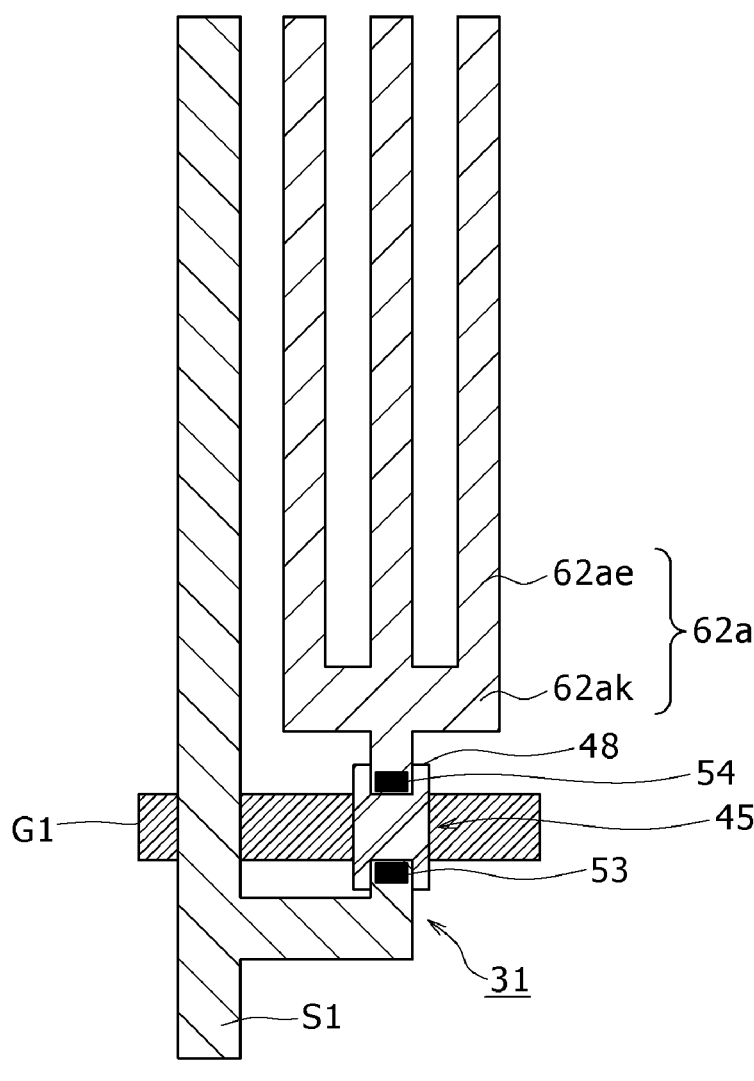
FIG. 5 is a schematic plan view showing part of a display region of each pixel in the pixel region of the liquid crystal panel of FIG. 2.

FIG. 5 is a plan view showing part of the display region TA in the embodiment 1 of the present invention. Referring to FIG. 5, as seen from a legend, different materials of individual members are indicated by different corresponding symbolic section linings, and the positions of contacts for electrically connecting the members are shown. It is to be noted that, in FIG. 5, although a dot region corresponding to the red filter layer 21R in the pixel P shown in FIG. 4 is shown, also in the dot regions corresponding to the green filter layer 21G and the blue filter layer 21B, the individual members are formed in a similar manner as in the dot region corresponding to the red filter layer 21R.

As seen in FIG. 5, in the display region TA, a pixel switching element 31 and a gate lines G1 are formed in addition to the color filter layer 21, pixel electrode 62a, common electrode 62b and first data line S1 shown in FIG. 4.

In this display region TA, illuminating light R emitted from the backlight 300 is transmitted from the TFT array substrate 201 side to the opposing substrate 202 side to carry out image display.

Here, both of the first data line S1 and the gate lines G1 are formed from a metal material such as aluminum or molybdenum so that they intercept light. Therefore, in the display region TA, the illuminating light R is transmitted through a light transmission region HA defined by the lines to carry out image display as seen in FIG. 4.

In the present embodiment, since the display mode of the liquid crystal panel 200 is the FFS type as described hereinabove, a transverse electric field is applied from the pixel electrode 62a and the common electrode 62b to the liquid crystal layer 203 to display an image.

Meanwhile, in the sensor region RA of the liquid crystal panel 200, a visible ray cut filter layer 21S, a light receiving element 32, a second data line S2, a power supply voltage line HD and a reference voltage line HS are formed as seen in FIG. 4.

Figure 6:
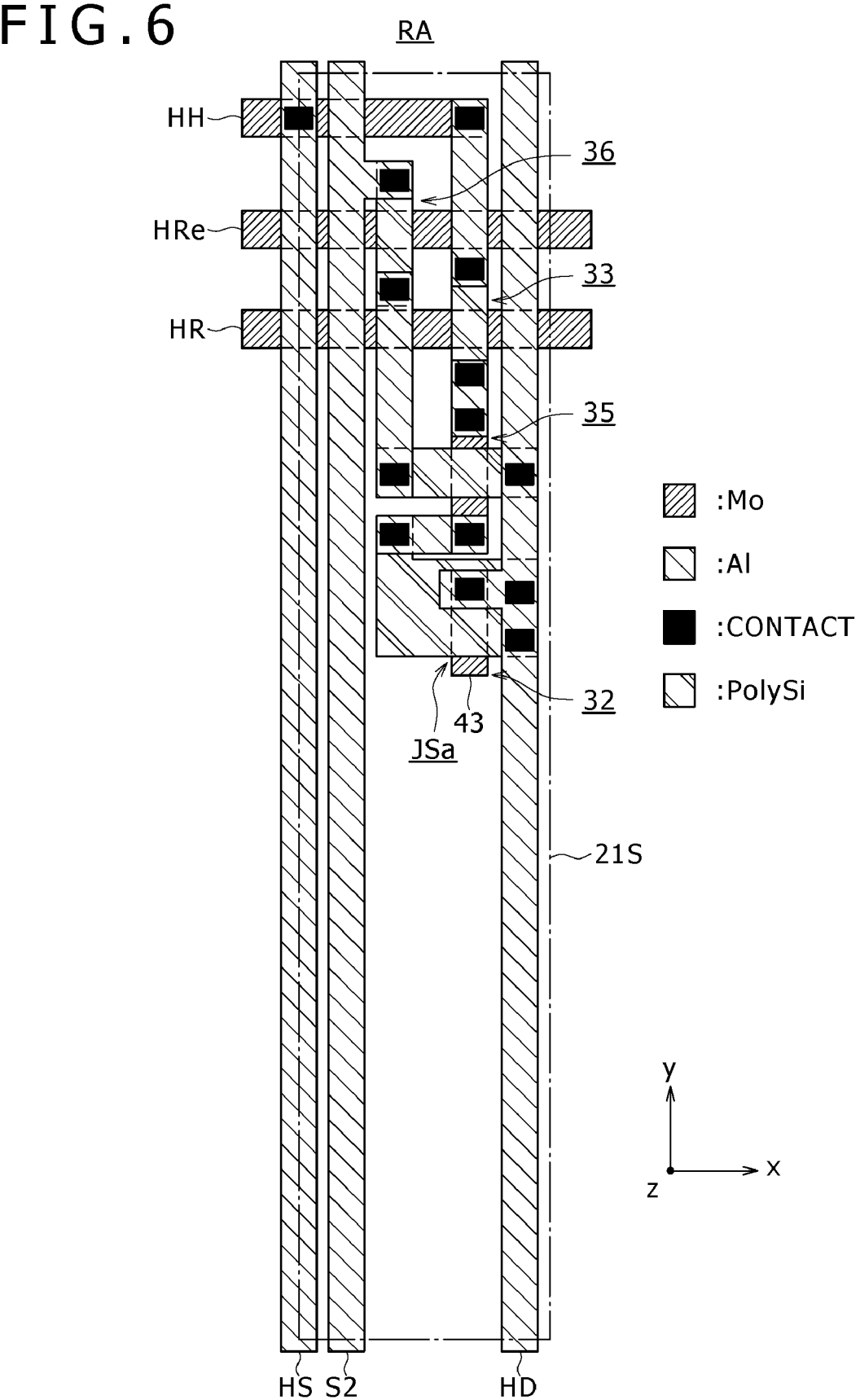
FIG. 6 is a schematic plan view showing part of a sensor region of each pixel in the pixel region of the liquid crystal panel of FIG. 2.

FIG. 6 is a plan view showing part of the sensor region RA in the embodiment 1 of the present embodiment. In FIG. 6, as seen from a legend, different materials of individual members are indicated by different corresponding symbolic section linings, and the positions of contacts for electrically connecting the members are shown. Further, the visible ray cut filter layer 21S is indicated by an alternate long and short dash line.

As seen in FIG. 6, in the sensor region RA, a reset transistor 33, an amplifying transistor 35, a selection transistor 36, a reset signal line HR and a read line HRe are formed in addition to the visible ray cut filter layer 21S, light receiving element 32, second data line S2, power supply voltage line HD and reference voltage line HS shown in FIG. 4.

In the sensor region RA, reflected light H reflected by the detection object body F on the front face side of the liquid crystal panel 200 is received by the light receiving element 32 to produce received light data as seen in FIG. 4.

Here, the lines of the second data line S2, power supply voltage line HD, reference voltage line HS, reset signal line HR and read line HRe are formed from a metal material in such a manner as to intercept light. Therefore, in the sensor region RA, the reflected light H is introduced to a light receiving face JSa of the light receiving element 32 in a light receiving region SA defined by the lines as seen in FIGS. 4 and 6. Therefore, in the light receiving region SA, the reflected light H coming in through the visible ray cut filter layer 21S is received by the light receiving face JSa of the light receiving element 32 to produce received light data.

The components provided on the TFT array substrate 201 are described successively.

In the TFT array substrate 201, the pixel switching element 31 is formed in the display region TA of the liquid crystal panel 200 as seen in FIG. 5. Although the pixel switching element 31 is not shown in FIG. 4, it is formed on the face of the TFT array substrate 201 opposing to the opposing substrate 202 similarly to the light receiving element 32 shown in FIG. 4.

The pixel switching elements 31 are provided corresponding to the red filter layer 21R, green filter layer 21G and blue filter layer 21B which form the color filter layer 21 in the pixel P as seen in FIG. 4.

Figure 7:
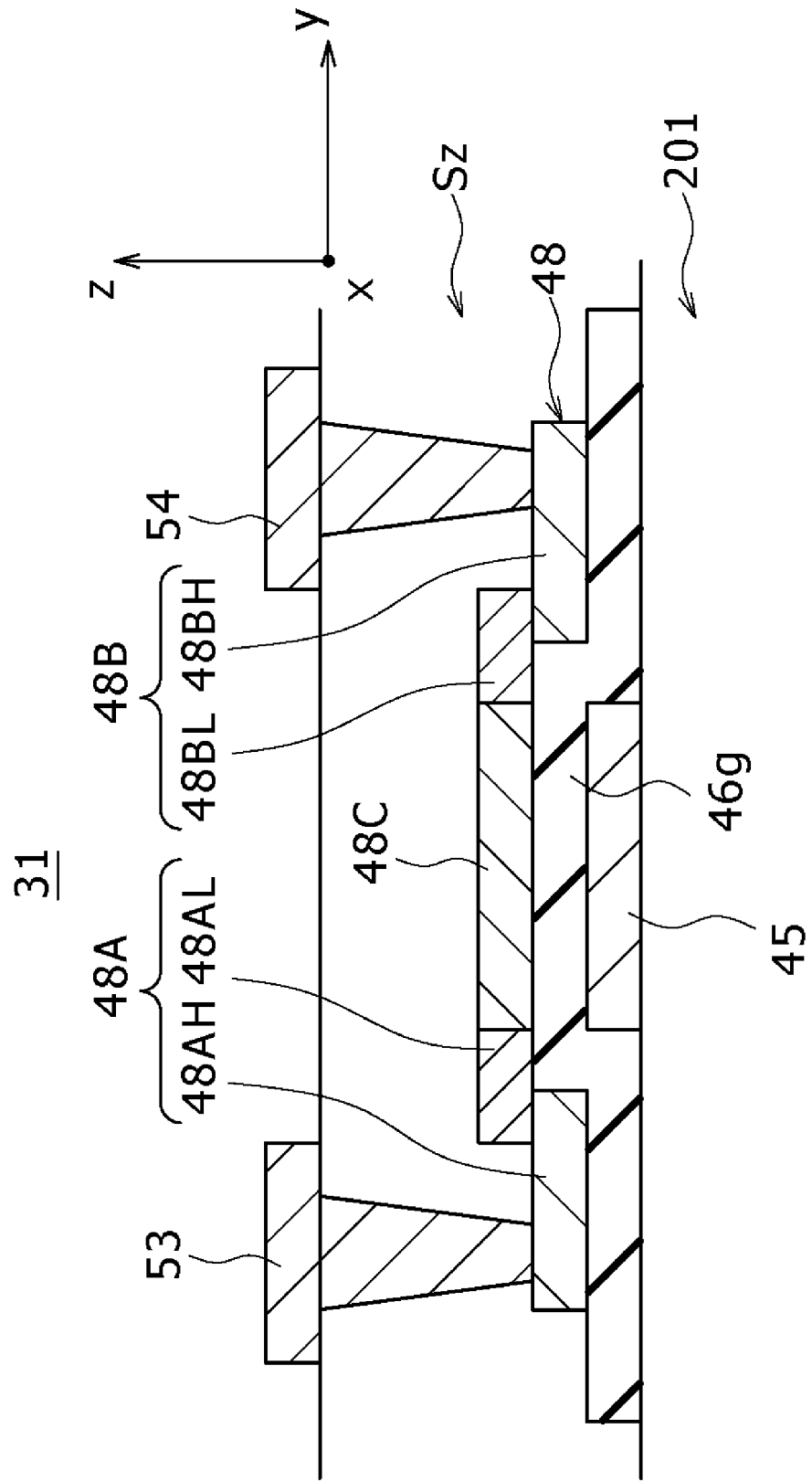
FIG. 7 is a schematic cross sectional view showing a pixel switching element in the liquid crystal panel of FIG. 2.

FIG. 7 shows the pixel switching element 31 in the embodiment of the present invention.

Referring to FIG. 7, the pixel switching element 31 includes a gate electrode 45, a gate insulating film 46g and a semiconductor layer 48 and formed as a bottom gate type TFT of the LDD (Lightly Doped Drain) structure.

In particular, the gate electrode 45 of the pixel switching element 31 is formed using a metal material such as molybdenum. Here, as shown in FIG. 7, the gate electrode 45 is provided in an opposing relationship to a channel region 48C of the semiconductor layer 48 through the gate insulating film 46g on the face of the TFT array substrate 201.

Meanwhile, the gate insulating film 46g of the pixel switching element 31 is formed using an insulating material such as a silicon oxide film or a silicon nitride film. The gate insulating film 46g is formed so as to cover over the gate electrode 45 as seen in FIG. 7.

Further, the semiconductor layer 48 of the pixel switching element 31 is formed, for example, from polycrystalline silicon. In the semiconductor layer 48, the channel region 48C is formed in a corresponding relationship to the gate electrode 45 as seen in FIG. 7, and a pair of source-drain regions 48A and 48B are formed in such a manner as to sandwich the channel region 48C therebetween. A pair of low concentration impurity regions 48AL and 48BL are formed on the source-drain regions 48A and 48B in such a manner as to sandwich the channel region 48C therebetween. Further, a pair of high concentration impurity regions 48AH and 48BH having a concentration higher than that of the low concentration impurity regions 48AL and 48BL are formed in such a manner as to sandwich the low concentration impurity regions 48AL and 48BL therebetween. As shown in FIG. 7, the semiconductor layer 48 is covered with an interlayer insulating film Sz. The interlayer insulating film Sz is formed, for example, from a silicon nitride film or a silicon oxide film.

The source electrode 53 and the drain electrode 54 of the pixel switching element 31 are formed using a conductive material such as aluminum. Here, each of the source electrode 53 and the drain electrode 54 is formed by forming a contact hole so as to extend through the interlayer insulating film Sz, embedding the conductive material into the contact hole and then carrying out patterning. In particular, the source electrode 53 is provided in an electrically connected state to a source-drain region 48A while the drain electrode 54 is electrically connected to the other source-drain region 48B.

In the TFT array substrate 201, the light receiving element 32 is formed on the face of the TFT array substrate 201 which opposes to the opposing substrate 202 as seen in FIG. 4.

Here, the light receiving element 32 is provided in a corresponding relationship to the light receiving region SA in the sensor region RA as seen in FIG. 4 such that it receives light emitted from the opposing substrate 202 side toward the TFT array substrate 201 side in the light receiving region SA through the liquid crystal layer 203. Then, the light receiving element 32 receives and photoelectrically converts light incident from the light receiving region SA to form received light data, and the thus produced received light data is read out.

In the present embodiment, the light receiving element 32 receives reflected light H reflected toward the front face side to the rear face side of the liquid crystal panel 200 from the detection object body F when illuminating light R emitted from the backlight 300 is illuminated upon the detection object body F as seen in FIG. 4 to produce received light data. For example, the light receiving element 32 receives, on the light receiving face JSa thereof, the reflected light H incident through the liquid crystal layer 203 to produce received light data.

Figure 8:
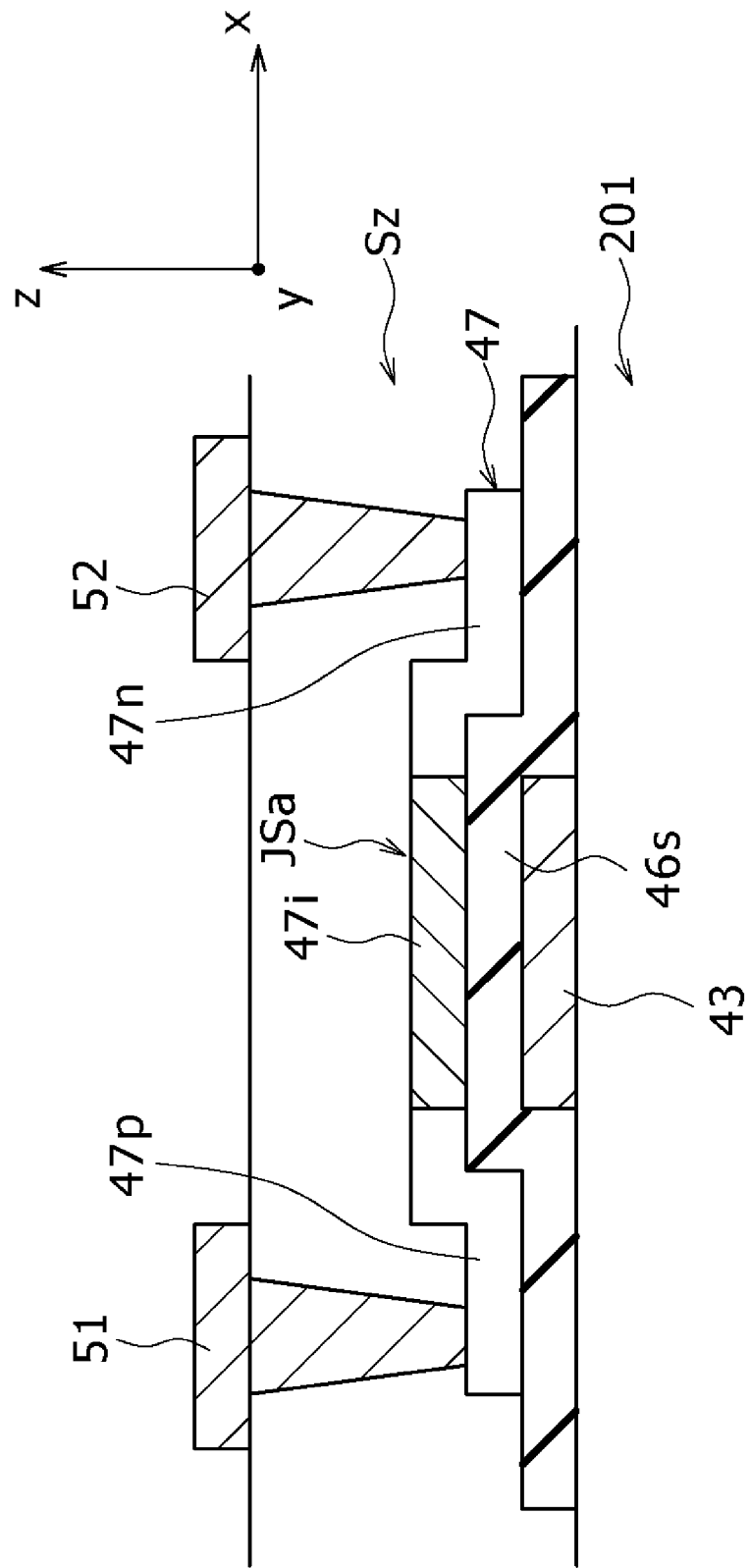
FIG. 8 is a schematic cross sectional view showing a light receiving element in the liquid crystal panel of FIG. 2.

FIG. 8 is a sectional view showing the light receiving element 32 in the embodiment 1 of the present invention.

Referring to FIG. 8, the light receiving element 32 is a photodiode of the PIN (P-intrinsic-N) structure and includes a control electrode 43, an insulating film 46s provided on the control electrode 43, and a semiconductor layer 47 opposing to the control electrode 43 with the insulating film 46s interposed therebetween.

In particular, the control electrode 43 of the light receiving element 32 is formed using a metal material such as molybdenum. Here, the control electrode 43 is formed on the face of the TFT array substrate 201 in an opposing relationship to an i layer 47i of the semiconductor layer 47 as seen in FIG. 8.

The insulating film 46s of the light receiving element 32 is formed using an insulating material such as a silicon oxide film. Here, the insulating film 46s is formed so as to cover over the control electrode 43 as seen in FIG. 8.

Further, the semiconductor layer 47 of the light receiving element 32 is formed, for example, from polycrystalline silicon and includes a p layer 47p, an n layer 47n and an i layer 47i as seen in FIG. 8. The semiconductor layer 47 is provided such that the i layer 47i having high resistance is interposed between the p layer 47p and the n layer 47n. The i layer 47i has a light receiving face JSa, which receives light and carries out photoelectric conversion. The semiconductor layer 47 is covered with an interlayer insulating film Sz as seen in FIG. 8.

The anode electrode 51 and the cathode electrode 52 of the light receiving element 32 are formed using aluminum. As shown in FIG. 8, the anode electrode 51 and the cathode electrode 52 are formed by forming contact holes so as to extend through the interlayer insulating film Sz, embedding the conductive material into the contact hole and carrying out patterning. In particular, the anode electrode 51 is provided in an electrically connected relationship to the p layer 47p, and the cathode electrode 52 is electrically connected to the n layer 47n.

On the TFT array substrate 201, the reset transistor 33, amplifying transistor 35 and selection transistor 36 are formed in the sensor region RA of the liquid crystal panel 200 as seen in FIG. 6. The reset transistor 33, amplifying transistor 35 and selection transistor 36 are formed, for example, as a bottom gate type TFT similarly to the pixel switching element 31.

Referring to FIG. 4, the pixel electrodes 62a are formed on the side of the TFT array substrate 201 opposing to the opposing substrate 202.

Here, the pixel electrodes 62a are provided on an insulating film 60c formed from an insulating material such that it covers the common electrode 62b on the TFT array substrate 201. For example, the pixel electrodes 62a are formed on the insulating film 60c formed as a silicon nitride film. The pixel electrodes 62a are provided in an individually opposing relationship to the red filter layer 21R, green filter layer 21G and blue filter layer 21B which form the color filter layer 21 as seen in FIG. 4. The pixel electrodes 62a are transparent electrodes and is formed, for example, using ITO (Indium Tin Oxide). Each of the pixel electrodes 62a is electrically connected to the drain electrode 54 of a pixel switching element 31. The pixel electrode 62a cooperates with the common electrode 62b to produce a transverse electric field therebetween with a potential supplied thereto as an image signal from the pixel switching element 31 thereby to apply a voltage to the liquid crystal layer 203.

In the present embodiment, since the liquid crystal panel 200 is of the FFS type, the pixel electrode 62a is formed in a comb-tooth shape in the direction of the xy face of the TFT array substrate 201 opposing to the opposing substrate 202.

In particular, referring to FIG. 5, the pixel electrode 62a includes a trunk portion 62ak and a plurality of branch portions 62ae.

The trunk portion 62ak extends in the x direction as seen in FIG. 5.

The branch portions 62ae extend in the y direction as seen in FIG. 5. The branch portions 62ae are disposed in a juxtaposed relationship with and in a spaced relationship from each other in the x direction. Each of the branch portions 62ae is connected at one end portion thereof to the trunk portion 62ak, and the branch portions 62ae extend in parallel to each other in the y direction.

Referring to FIG. 4, the common electrode 62b is formed on the face of the TFT array substrate 201 which opposes to the opposing substrate 202. Here, the common electrode 62b is provided on a flattening film 60b formed on the TFT array substrate 201 in such a manner as to cover the lines. For example, the flattening film 60b is formed from an organic compound such as an acrylic resin. The common electrode 62b is a transparent electrode and is formed, for example, using ITO. The common electrode 62b is opposed to the pixel electrodes 62a, which are provided corresponding to the pixels P, with the insulating film 60c interposed therebetween.

In the present embodiment, since the liquid crystal panel 200 is of the FFS type, the common electrode 62b is formed in a solid state such that it covers the overall face of the display region TA in the direction of the xy face of the TFT array substrate 201 opposing to the opposing substrate 202 as seen in FIG. 4.

Figure 9:
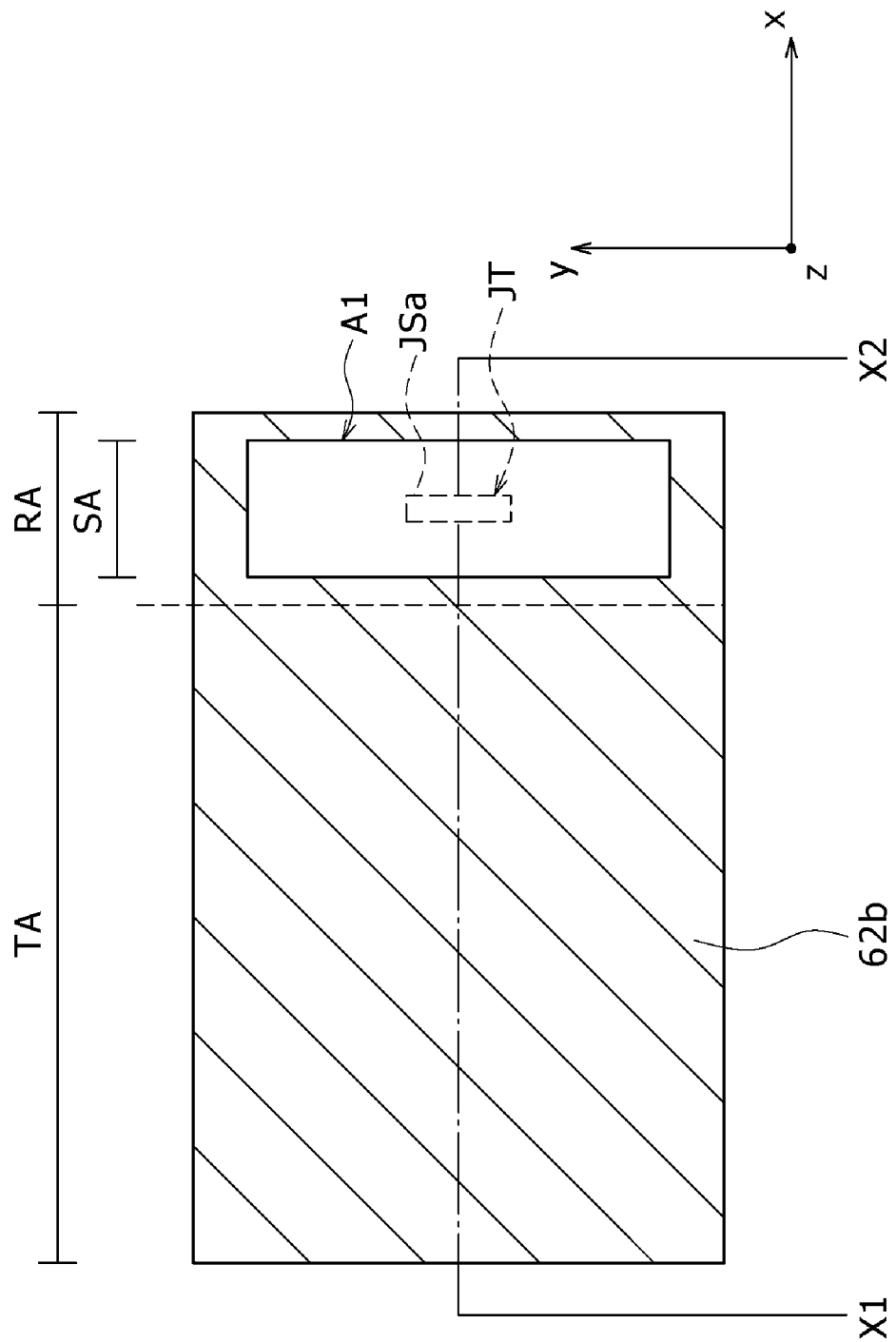
FIG. 9 is a schematic plan view showing a common electrode in the liquid crystal panel of FIG. 2.

FIG. 9 is a plan view showing the common electrode 62b in the embodiment 1 of the present invention. Referring to FIG. 9, a cross section taken along line X1-X2 corresponds to FIG. 4.

As seen in FIG. 9, in the sensor region RA, the common electrode 62b has an opening formed in a first region A1 including a light receiving face corresponding region JT, which corresponds to the light receiving face JSa of the light receiving element 32, such that it is provided in a region other than the light receiving face corresponding region JT.

In particular, the first region A1 is defined in a predetermined range from a periphery of the light receiving face corresponding region JT toward a periphery of the sensor region RA between the periphery of the light receiving face corresponding region JT and the periphery of the sensor region RA, and the opening is formed corresponding to the first region A1. In particular, as seen in FIG. 9, the common electrode 62b is not formed in the first region A1 but in any other region of the pixel region PA than the first region A1.

Referring to FIG. 4, the first data lines S1 are formed on the face of the TFT array substrate 201 opposing to the opposing substrate 202 as seen in FIG. 4. Here, the first data lines S1 are provided on an insulating film 60a formed on the TFT array substrate 201 in such a manner as to cover the semiconductor elements such as the light receiving element 32.

Referring to FIG. 5, each of the first data lines S1 extends in the y direction and is formed using a metal material such as aluminum. The first data line S1 is electrically connected to the source electrode of the pixel switching element 31.

Referring to FIG. 4, the second data line S2, power supply voltage line HD and reference voltage line HS are formed on the face of the TFT array substrate 201 opposing to the opposing substrate 202 similarly to the first data lines S1. The second data line S2, power supply voltage line HD and reference voltage line HS are provided on the insulating film 60a formed on the TFT array substrate 201 in such a manner as to cover the semiconductor elements such as the light receiving element 32.

Further, referring to FIG. 6, the second data line S2, power supply voltage line HD and reference voltage line HS extend in the y direction and are formed using a metal material such as aluminum. The second data line S2 is electrically connected to the selection transistor 36 as seen in FIG. 6. The power supply voltage line HD is electrically connected to the light receiving element 32 and the amplifying transistor 35. The reference voltage line HS is connected to the reset transistor 33 through a lead line HH formed from molybdenum as seen in FIG. 6.

Referring to FIGS. 4 and 6, the lines of the second data line S2, power supply voltage line HD and reference voltage line HS are provided in a region in the sensor region RA other than the light receiving face corresponding region JT which corresponds to the light receiving face JSa. In particular, the lines are provided in such a manner as to define the light receiving region SA in the sensor region RA.

On the TFT array substrate 201, the gate line G1 is formed in the display region TA of the liquid crystal panel 200 as shown in FIG. 5. The gate line G1 extends in the x direction and is formed from a metal material such as molybdenum. Here, the gate line G1 is electrically connected to the gate of the pixel switching element 31 as seen in FIG. 5 and is formed on the face of the TFT array substrate 201 on the side opposing to the opposing substrate 202 similarly to the light receiving element 32 shown in FIG. 4.

On the TFT array substrate 201, the reset signal line HR and the read line HRe are formed in the sensor region RA of the liquid crystal panel 200 as seen in FIG. 6. The reset signal line HR and the read line HRe extend in the x direction and are formed using a metal material such as molybdenum. The reset signal line HR is electrically connected to the gate of the reset transistor 33 as seen in FIG. 6. The read line HRe is electrically connected to the gate of the selection transistor 36 as seen in FIG. 6.

The components provided on the opposing substrate 202 are described below.

Referring to FIG. 4, the color filter layer 21 is formed on the face of the opposing substrate 202 opposing to the TFT array substrate 201. The color filter layer 21 includes a set of color filter layers for the three primary colors of red, green and blue and particularly includes a red filter layer 21R, a green filter layer 21G and a blue filter layer 21B. The color filter layer 21 is formed by applying coating liquid containing a coloring pigment corresponding to each color and a photo-resist material by a coating method such as spin coating to form a coating film and then patterning the coating film by a lithography technique. Here, for example, a polyimide resin is used as the photo-resistor material. The red filter layer 21R, green filter layer 21G and blue filter layer 21B are configured such that illuminating light R emitted from the backlight 300 is colored thereby and transmitted from the TFT array substrate 201 side to the opposing substrate 202 side therethrough. In particular, the red filter layer 21R colors the illuminating light R to red; the green filter layer 21G colors the illuminating light R to green and the blue filter layer 21B colors the illuminating light R to blue while they transmit the illuminating light R therethrough.

The visible ray cut filter layer 21S is formed on the face of the opposing substrate 202 opposing to the TFT array substrate 201 as seen in FIG. 4. Here, the visible ray cut filter layer 21S is disposed in a corresponding relationship to the sensor region RA as seen in FIG. 4 and formed such that it transmits therethrough a greater amount of infrared light rays than that of visible rays from within light incident to the light receiving face JSa of the light receiving element 32 in the sensor region RA.

In the present embodiment, the visible ray cut filter layer 21S is a color filter laminate including a red filter layer 21Rs and a blue filter layer 21Bs as seen in FIG. 4 and is configured such that the red filter layer 21Rs and the blue filter layer 21Bs are successively laminated from the opposing substrate 202 side. Each of the red filter layer 21Rs and the blue filter layer 21Bs is formed using a polyimide resin which contains a coloring agent such as a pigment or dyestuff similarly to the color filter layer 21.

Figure 10:
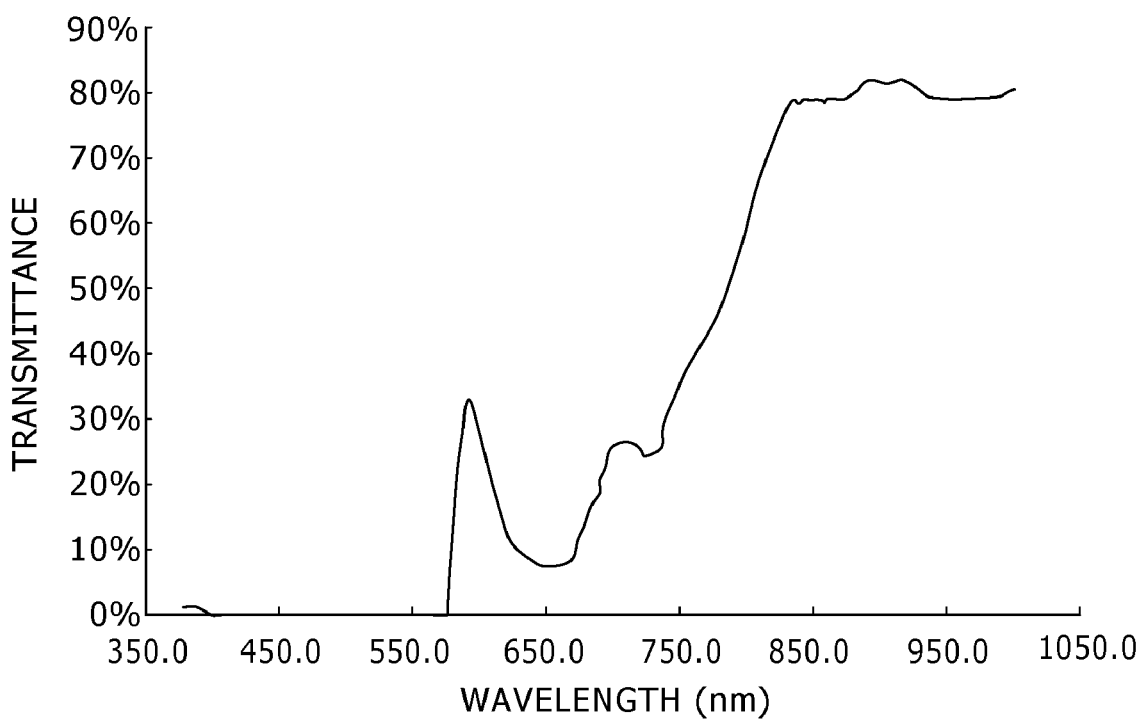
FIG. 10 is a graph illustrating a spectral characteristic of a visible ray cut filter layer in the liquid crystal panel of FIG. 2.

FIG. 10 illustrates a spectral characteristic of the visible ray cut filter layer 21S in the embodiment of the present invention. Referring to FIG. 10, the axis of abscissa indicates the wavelength (nm) of the incident light and the axis of ordinate indicates the transmittance (%) of the incident light.

The visible ray cut filter layer 21S is a color filter laminate including a red filter layer 21Rs and a blue filter layer 21Bs as described above. Here, the red filter layer 21Rs transmits a greater amount of light in a wavelength region corresponding to the red color in the visible rays than that of light in the other wavelength regions. Meanwhile, the blue filter layer 21Bs transmits a greater amount of light in a wavelength region corresponding to the blue color in the visible rays than that of light in the other wavelength regions. Therefore, as seen in FIG. 10, the visible ray cut filter layer 21S is formed such that the transmittance of light in the wavelength region corresponding to infrared rays is higher than that in the wavelength region corresponding to visible rays. The visible ray cut filter layer 21S is formed such that, as regards infrared rays whose center wavelength is 850 nm, the light transmittance is approximately 80%, and as regards visible rays, the light transmittance is equal to or lower than approximately 35%.

The visible ray cut filter layer 21S is formed by a step same as the step at which the red filter layer 21R and the blue filter layer 21B which compose the color filter layer 21 are formed. For example, coating liquid containing a coloring pigment of red and a photo-resist material is applied by a coating method such as spin coating to form a coating film. Thereafter, the coating film is patterned by a lithography technique or the like to form the red filter layer 21R of the color filter layer 21 and the red filter layer 21Rs of the visible ray cut filter layer 21S. Further, coating liquid containing a coloring pigment of blue and a photo-resist material is applied by a coating method such as spin coating to form a coating film. Thereafter, the coating film is patterned to form the blue filter layer 21B of the color filter layer 21 and the blue filter layer 21Bs of the visible ray cut filter layer 21S. Here, the patterning is carried out such that the blue filter layer 21Bs of the visible ray cut filter layer 21S is laminated on the red filter layer 21Rs of the visible ray cut filter layer 21S.

Figure 11:
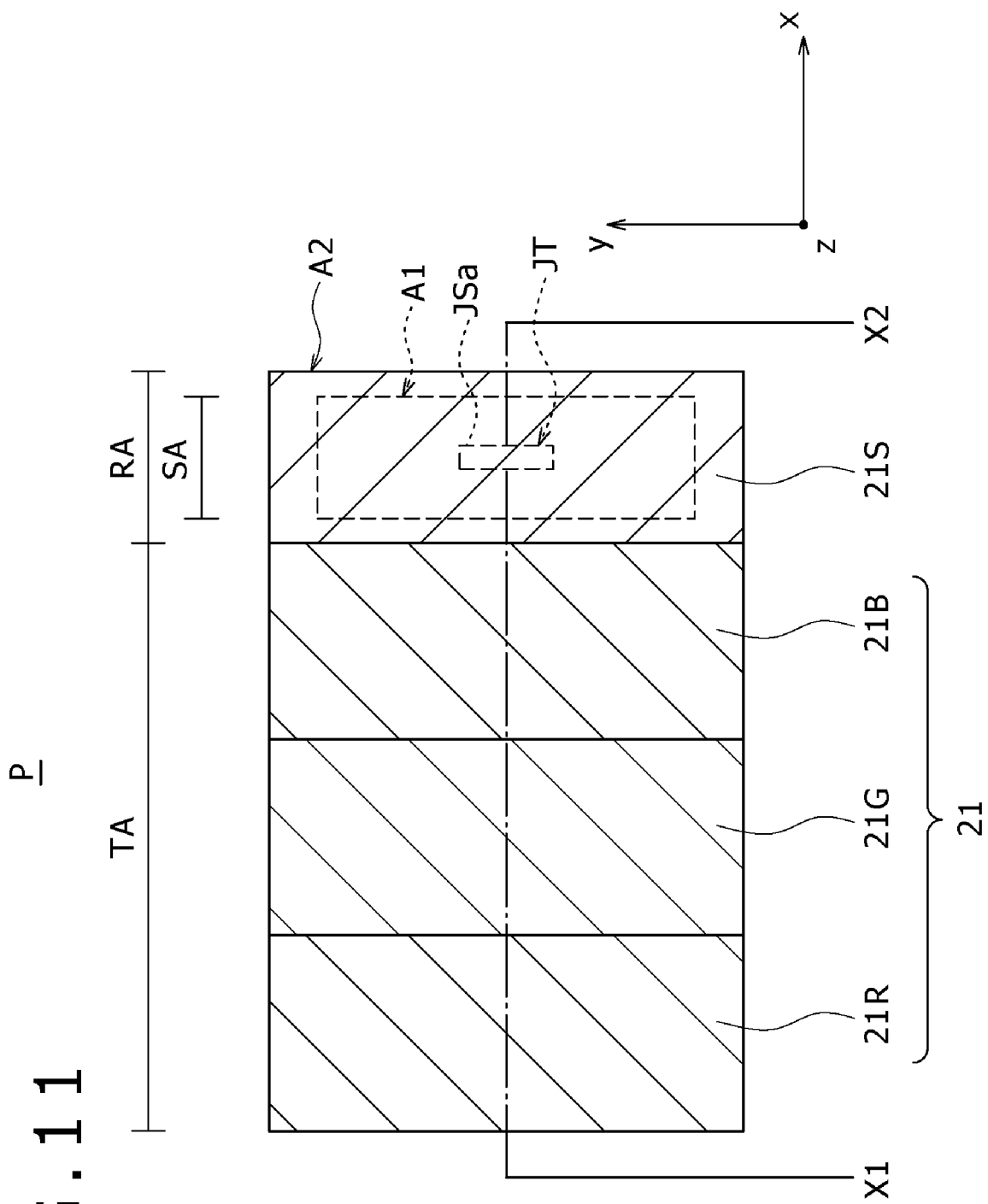
FIG. 11 is a schematic plan view showing part of an opposing substrate in the liquid crystal panel of FIG. 2.

FIG. 11 is a plan view showing part of the opposing substrate 202 in the embodiment 1 of the present invention. Referring to FIG. 11, a cross section taken along line X1-X2 corresponds to FIG. 4.

The red filter layer 21R, green filter layer 21G and blue filter layer 21B which compose the color filter layer 21 are formed, for example, in a rectangular shape and juxtaposed in the x direction.

The visible ray cut filter layer 21S has, for example, a rectangular shape similarly to the red filter layer 21R, green filter layer 21G and blue filter layer 21B which compose the color filter layer 21 and is juxtaposed in the x direction with the red filter layer 21R, green filter layer 21G and blue filter layer 21B as seen in FIG. 11.

The visible ray cut filter layer 21S is formed in the sensor region RA such that it includes a light receiving face corresponding region JT corresponding to the light receiving face JSa of the light receiving element 32 as seen in FIG. 11.

Here, the visible ray cut filter layer 21S includes a first region A1 defined so as to be greater than the light receiving face corresponding region JT in the pixel region PA and covers a second region A2 which is greater than the first region A1.

In particular, the second region A2 is defined so as to have a predetermined range extending from a periphery of the first region A1 to a periphery of the sensor region RA between the periphery of the first region A1 and the periphery of the sensor region RA. The visible ray cut filter layer 21S is formed so as to correspond to the second region A2.

In the present embodiment, the sensor region RA is provided so as to correspond to the second region A2 in the pixel region PA, and the visible ray cut filter layer 21S is provided so as to cover the entire sensor region RA.

It is to be noted that, in the liquid crystal panel 200 described above, although the auxiliary capacitance element Cs shown in FIG. 3A is not indicated clearly, a portion of the insulating film 60c which is sandwiched by the pixel electrode 62a and the common electrode 62b as seen in FIG. 4 functions as the auxiliary capacitance element Cs.

Configuration of the Backlight

Figure 12:
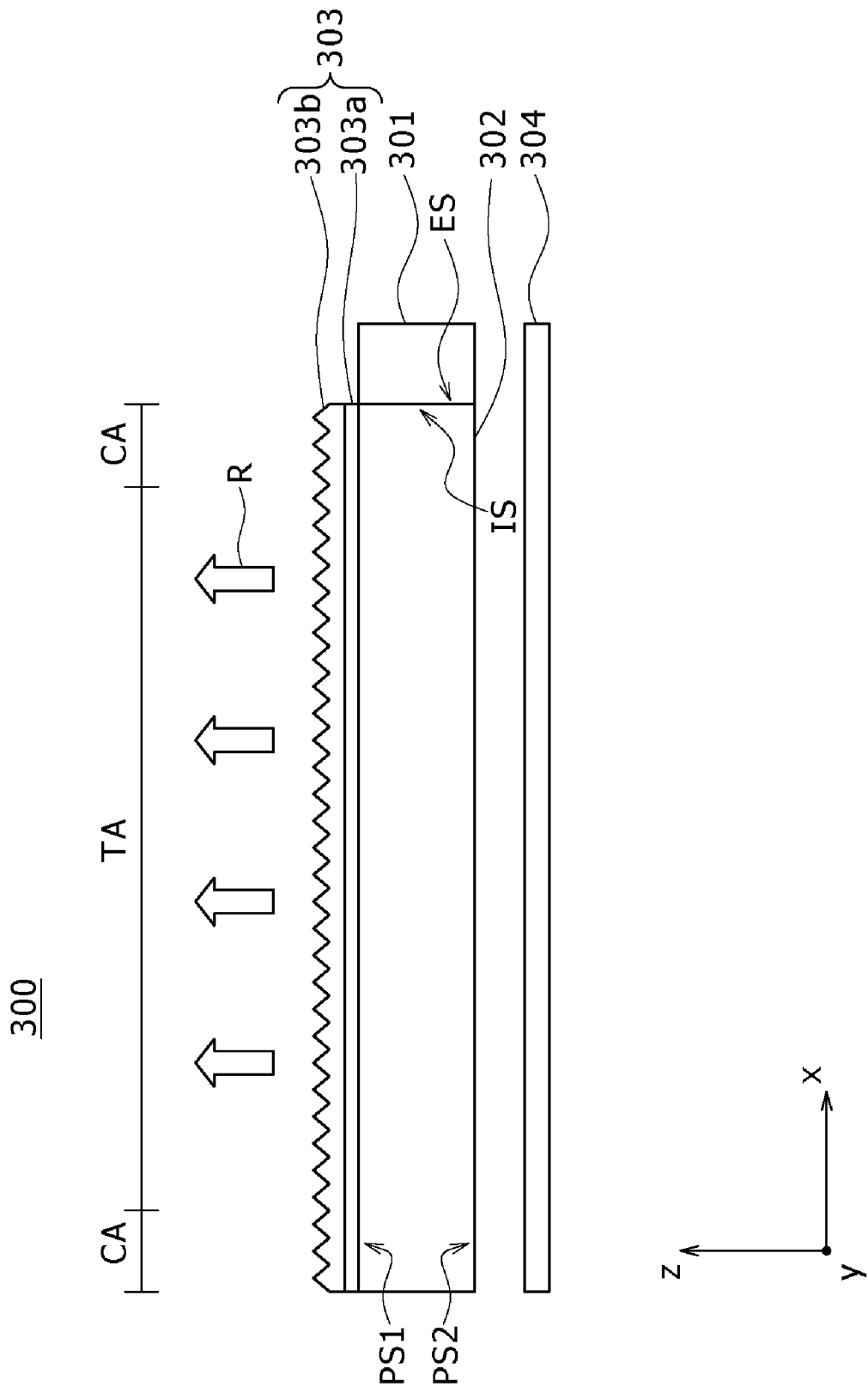
FIG. 12 is a cross sectional view schematically showing a backlight in the liquid crystal panel of FIG. 2.
Figure 13:
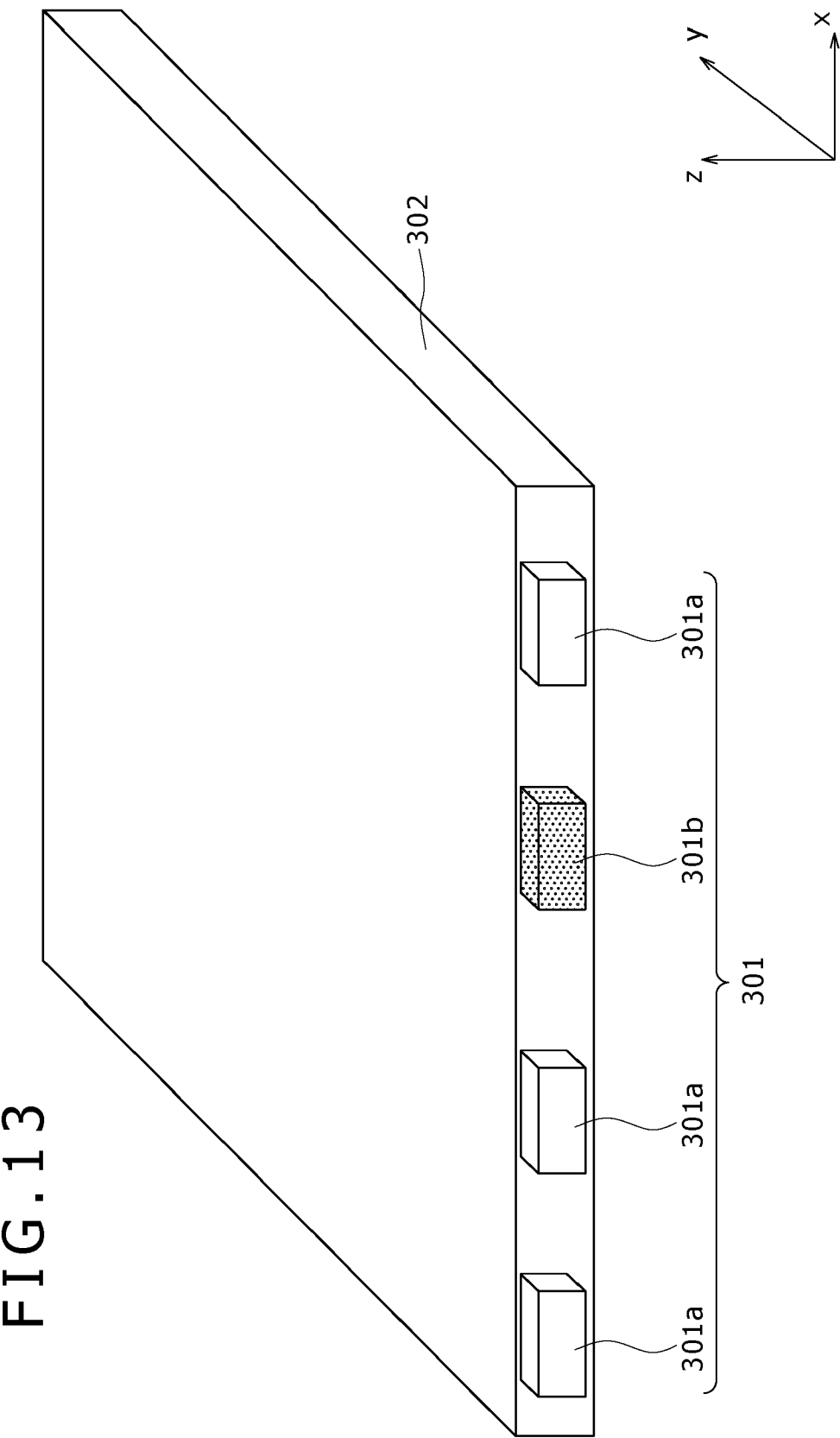
FIG. 13 is a perspective view schematically showing part of the backlight of FIG. 12.

FIG. 12 is a sectional view schematically showing the backlight 300 in the embodiment of the present invention. FIG. 13 is a perspective view schematically showing part of the backlight 300 in the embodiment 1.

Referring to FIG. 12, the backlight 300 includes a light source 301 and a light guide plate 302 and emits the illuminating light R so as to illuminate the overall area of the pixel region PA of the liquid crystal panel 200.

The light source 301 includes a light emitting face ES for irradiating light and is disposed such that the light emitting face ES opposes to an incidence face IS to which light is introduced. Here, the light emitting face ES of the light source 301 is opposed to the incidence face IS provided on a side face of the light guide plate 302. The light source 301 receives a control signal supplied thereto from the control section 401 and carries out a light emitting operation based on the control signal.

In the present embodiment, the light source 301 includes a visible light source 301a and an infrared light source 301b as seen in FIG. 13.

The visible light source 301a is, for example, a white light LED (light emitting diode) and irradiates white visible rays. The visible light source 301a is disposed such that the light emitting face ES thereof is opposed to the incidence face IS of the light guide plate 302 as seen in FIG. 13, and visible rays are irradiated from the light emitting face ES upon the incidence face IS of the light guide plate 302. Here, a plurality of such visible light sources 301a are provided and disposed in a juxtaposed relationship along the incidence face IS of the light guide plate 302.

The infrared light source 301b is, for example, an infrared LED and irradiates infrared rays. The infrared light source 301b is disposed such that the light emitting face ES thereof is opposed to the incidence face IS of the light guide plate 302 as seen in FIG. 13, and infrared ray is irradiated from the light emitting face ES upon the incidence face IS of the light guide plate 302. In this instance, the infrared light source 301b irradiates infrared rays having a center frequency of 850 nm. Here, the single infrared light source 301b is provided and disposed in a juxtaposed relationship with the visible light sources 301a on the incidence face IS of the light guide plate 302 on which the visible light sources 301a are provided. In the present embodiment, the infrared light source 301b is disposed at a substantially central location of the incidence face IS of the light guide plate 302 on which the visible light sources 301a are provided.

Referring to FIG. 12, the light guide plate 302 is provided such that the light emitting face ES of the light source 301 is opposed to the incidence face IS thereof, and light irradiated from the light emitting face ES is introduced into the light guide plate 302. The light guide plate 302 guides the light incident to the incidence face IS thereof. Then, the thus guided light is emitted as illuminating light R from an emergence face PS1 provided perpendicularly to the incidence face IS. The light guide plate 302 is disposed in an opposing relationship to the back face of the liquid crystal panel 200 and irradiates the illuminating light R from the emergence face PS1 thereof toward the rear face of the liquid crystal panel 200. The light guide plate 302 is formed by injection molding using a transparent material having a high light emitting property like an acrylic resin.

In the present embodiment, the light guide plate 302 receives, at the incidence face IS thereof, both of visible rays emitted from the visible light source 301a and infrared rays emitted from the infrared light source 301b, and guides the visible rays and the infrared rays received at the incidence face IS. Then, the guided visible rays and infrared rays are emitted as illuminating light R from the emergence face PS1. Thus, an image is displayed in the pixel region PA of the liquid crystal panel 200 of the transmission type as described above.

Referring to FIG. 12, the light guide plate 302 includes an optical film 303 and a reflecting film 304.

The optical film 303 is provided in an opposing relationship to the emergence face PS1 on the light guide plate 302 as seen in FIG. 12. The optical film 303 receives the illuminating light R emitted from the emergence face PS1 of the light guide plate 302 and modulates the optical characteristic of the illuminating light R.

In the present embodiment, the optical film 303 includes a diffusion sheet 303a and a prism sheet 303b disposed in order from the light guide plate 302 side. The diffusion sheet 303a diffuses light emitted from the emergence face PS1 of the light guide plate 302, and the prism sheet 303b condenses the diffused light so as to be directed along the normal direction z to the emergence face PS1 of the light guide plate 302. Consequently, the optical film 303 emits the light emitted from the light guide plate 302 as the illuminating light R of plane light toward the rear face of the liquid crystal panel 200.

The reflecting film 304 is provided in an opposing relationship to the face of the light guide plate 302 positioned remotely from the emergence face PS1. The reflecting film 304 receives light emitted from a face PS2 of the light guide plate 302 positioned on the opposite side to the emergence face PS1 and reflects the light toward the emergence face PS1 side of the light guide plate 302.

Operation

In the following, operation of the liquid crystal display apparatus 100 described above to detect, when a finger of the human body as the detection object body F is brought into contact with or positioned in the proximity of the pixel region PA of the liquid crystal display apparatus 100, the position of the detection object body F based on received light data obtained from the detection object body F is described.

Figure 14A:
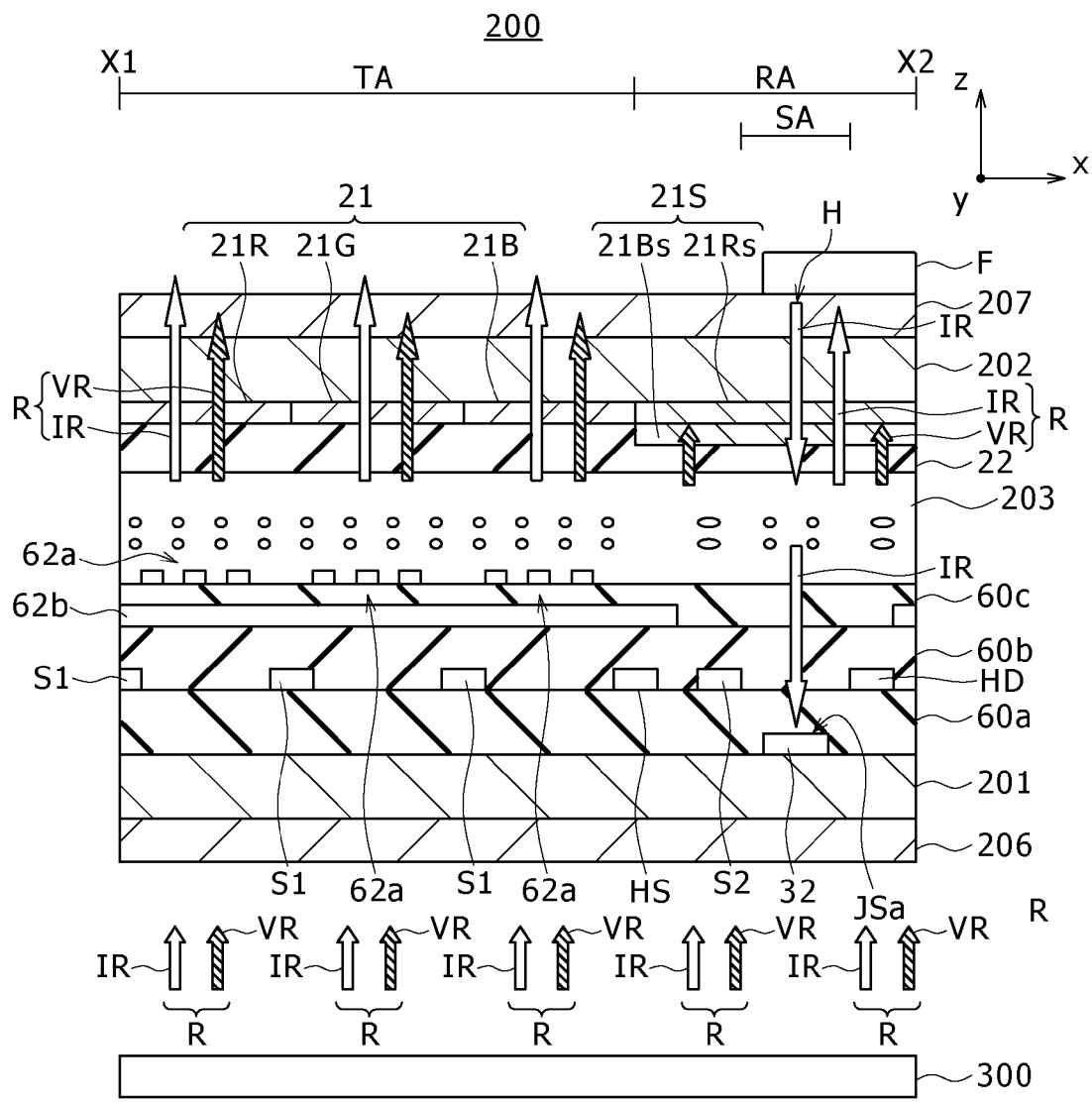
FIGS. 14A, 14B, 15A and 15B are cross sectional views schematically illustrating different manners in which, when a finger of the human body as a detection object body is brought into contact with or positioned in the proximity of the pixel region of the liquid crystal panel of FIG. 2, the position of the detection object body is detected based on received light data obtained from the detection object body.
Figure 14B:
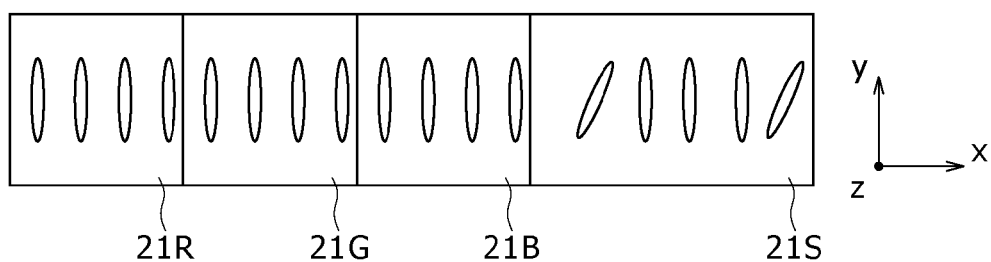
Figure 15A:
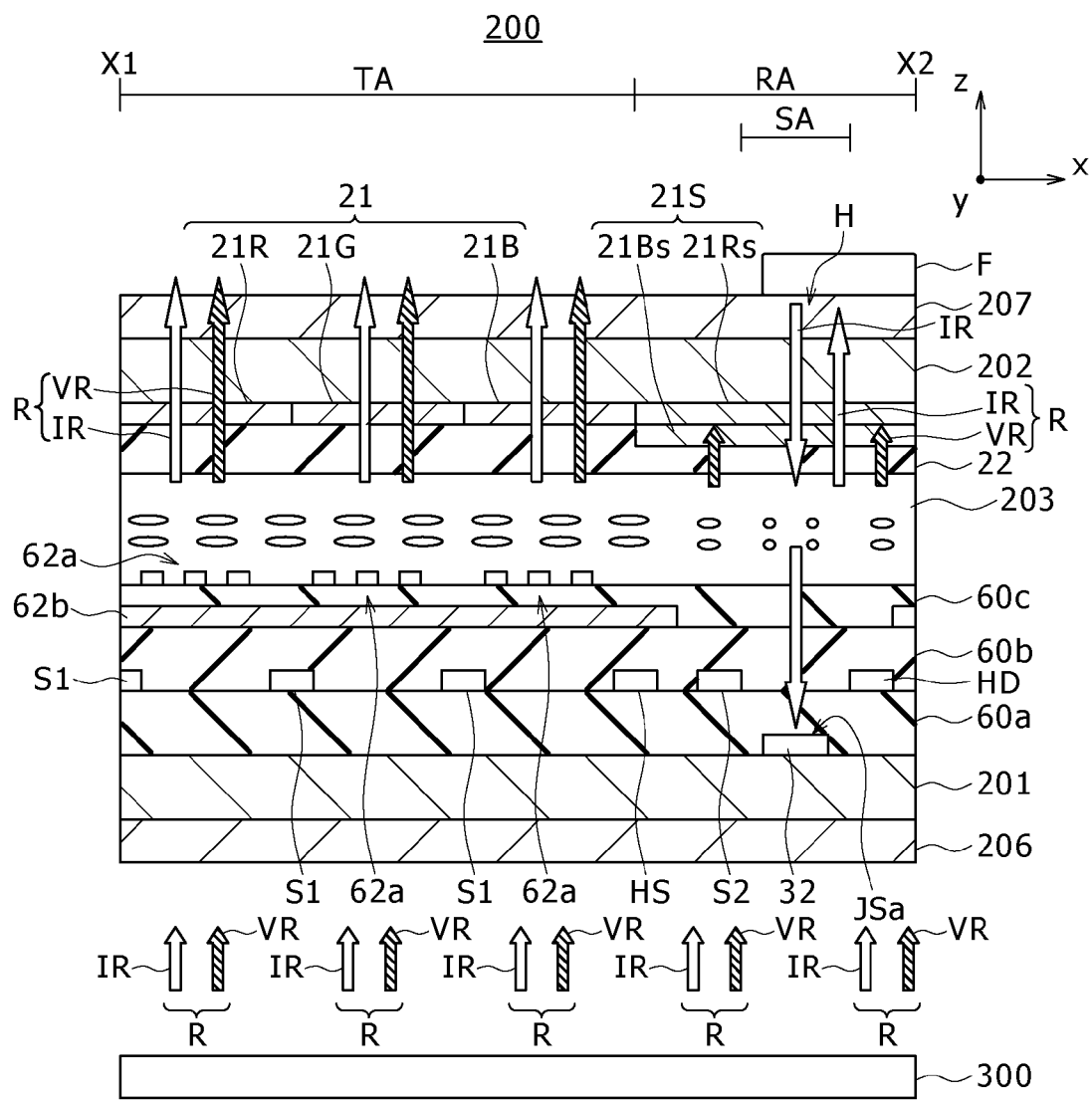
Figure 15B:
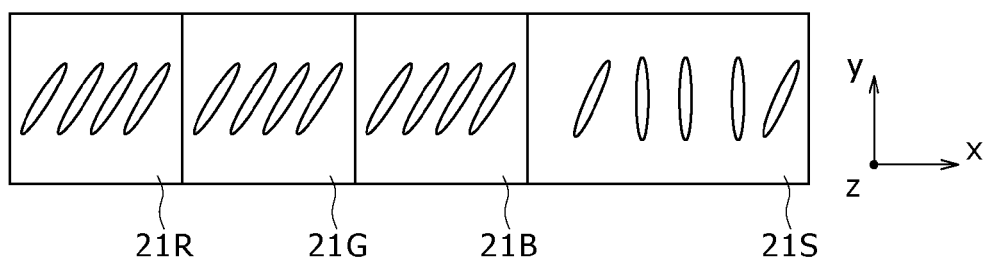

FIGS. 14A, 14B, 15A and 15B schematically illustrate different manners wherein, when a finger of the human body as the detection object body F is brought into contact with or positioned in the proximity of the pixel region PA of the liquid crystal display apparatus 100, the position of the detection object body F is detected based on received light data obtained from the detection object body F. In particular, FIGS. 14A and 14B illustrate the manner where the application of a voltage to the liquid crystal layer 203 is in an off state while FIGS. 15A and 15B illustrate the manner where the application of a voltage to the liquid crystal layer 203 is in an on state. In FIGS. 14A, 14B, 15A and 15B, part of the liquid crystal display apparatus 100 is shown while the other part is not shown, and FIGS. 14A and 15A are sectional views and FIGS. 14B and 15B are plan views.

First, operation when the application of a voltage to the liquid crystal layer 203 is in an off state is described.

In this instance, as seen from FIGS. 14A and 14B, in the display region TA of the liquid crystal panel 200, the longitudinal direction of liquid crystal molecules of the liquid crystal layer 203 oriented horizontally extends, for example, along the y direction. In the present embodiment, the normally black display method is used as the display method. Therefore, in the display region TA of the liquid crystal panel 200, visible rays VR of the illuminating light R irradiated from the backlight 300 are not transmitted through but are absorbed by the second polarizing plate 207 thereby to display the black.

Meanwhile, infrared rays IR of the illuminating light R irradiated from the backlight 300 are transmitted through the second polarizing plate 207.

On the other hand, in the sensor region RA of the liquid crystal panel 200, the visible rays VR of the illuminating light R illuminated from the backlight 300 are absorbed by the visible ray cut filter layer 21S and are not transmitted through the liquid crystal panel 200 similarly to the display region TA.

In the sensor region RA, a plurality of lines of the power supply voltage line HD, reference voltage line HS and second data line S2 are provided in a region, other than the light receiving face corresponding region JT, of the first region A1 in which the opening of the common electrode 62b is provided as described hereinabove. A fixed potential is applied to each of the power supply voltage line HD and the reference voltage line HS. Therefore, the lines of the power supply voltage line HD, reference voltage line HS and so forth produce a transverse electric field between the lines and an end portion of the common electrode 62b. Therefore, the longitudinal direction of liquid crystal molecules oriented horizontally in the liquid crystal layer 203 sometimes changes such that it extends along a direction different from the y direction as seen in FIGS. 14A and 14B. Consequently, the visible rays VR included in the illuminating light R illuminated from the backlight 300 are sometimes transmitted through the portion of the liquid crystal layer 203 in which the longitudinal direction of liquid crystal molecules changes and are mixed into the black display to deteriorate the image quality.

However, in the present embodiment, since the visible ray cut filter layer 21S is provided so as to correspond to the sensor region RA, the visible rays VR are blocked also in the portion of the liquid crystal layer 203 in which the longitudinal direction of liquid crystal molecules changes.

Accordingly, since the visible rays VR are not transmitted also through the portion of the liquid crystal layer 203 in which the longitudinal direction of liquid crystal molecules of the liquid crystal layer 203 changes, deterioration of the image quality can be prevented.

Meanwhile, the infrared rays IR of the illuminating light R illuminated from the backlight 300 are transmitted through the second polarizing plate 207 in the light receiving region SA as seen in FIG. 14A. Therefore, when the detection object body F such as a finger of the human body is brought into contact with or positioned in the proximity of the pixel region PA, the transmitted infrared rays IR are reflected by the detection object body F as seen in FIGS. 14A and 14B. Then, the reflected light H is received by the light receiving element 32 provided on the liquid crystal panel 200.

Here, the reflected light H directed toward the light receiving face JSa is received at the light receiving face JSa of the light receiving element 32 and photoelectrically converted by the light receiving element 32. Then, received light data by charge produced by the photoelectric conversion is read out by the peripheral circuits.

Then, the position detection section 402 uses the read out received light data in such a manner as described above to form an image of the detection object body F positioned in the pixel region PA on the front face side of the liquid crystal panel 200. Then, the position detection section 402 detects the position of the detection object body F from the thus formed image.

Now, the operation when the application of a voltage to the liquid crystal layer 203 is in an on state is described.

In this instance, in the display region TA of the liquid crystal panel 200, the longitudinal direction of horizontally orientated liquid crystal molecules of the liquid crystal layer 203 is inclined to a direction different from the y direction as seen in FIGS. 15A and 15B. Therefore, in the display region TA of the liquid crystal panel 200, the visible rays VR of the illuminating light R illuminated from the backlight 300 are transmitted through the second polarizing plate 207 to carry out white display. Further, also the infrared rays IR of the illuminating light R illuminated from the backlight 300 are transmitted through the second polarizing plate 207.

In contrast, in the sensor region RA of the liquid crystal panel 200, the visible rays VR of the illuminating light R illuminated from the backlight 300 are absorbed by the visible ray cut filter layer 21S without being transmitted through the liquid crystal panel 200.

In the sensor region RA, since the opening is provided in the common electrode 62b in a corresponding relationship to the first region A1 and the pixel electrode 62a is not provided as described hereinabove, no voltage is applied to the liquid crystal layer 203. Therefore, similarly as in the case wherein the application of a voltage to the liquid crystal layer 203 is in an off state, the visible rays VR included in the illuminating light R illuminated from the backlight 300 are absorbed and hence blocked by the visible ray cut filter layer 21S.

Further, the lines of the power supply voltage line HD, reference voltage line HS and so forth produce a horizontal electric field between the lines and the end portion of the common electrode 62b similarly as described hereinabove. Therefore, as seen in FIGS. 15A and 15B, the longitudinal direction of horizontally oriented liquid crystal molecules of the liquid crystal layer 203 sometimes changes so as to extend in a direction different from the y direction, and therefore, the image quality is sometimes deteriorated. However, in the present embodiment, the visible ray cut filter layer 21S is provided in a corresponding relationship to the sensor region RA. Therefore, even in the portion of the liquid crystal layer 203 in which the longitudinal direction of liquid crystal molecules changes, the visible rays VR are blocked, and consequently, deterioration of the image quality can be prevented.

Meanwhile, the infrared rays IR of the illuminating light R illuminated from the backlight 300 are transmitted through the second polarizing plate 207 in the light receiving region SA as seen in FIG. 15A. Therefore, when the detection object body F such as a finger of the human body is brought into contact with or positioned in the proximity of the pixel region PA, the transmitted infrared rays IR are reflected by the detection object body F as seen in FIGS. 15A and 15B. Then, the reflected light H is received by the light receiving element 32 provided on the liquid crystal panel 200. Then, the reflected light H directed toward the light receiving face JSa is received at the light receiving face JSa of the light receiving element 32 and photoelectrically converted by the light receiving element 32. Then, received light data by charge produced by the photoelectric conversion is read out by the peripheral circuits.

Then, the position detection section 402 uses the received light data read out from the light receiving element 32 to form an image of the detection object body F positioned in the pixel region PA on the front face side of the liquid crystal panel 200. Then, the position detection section 402 detects the position of the detection object body F from the thus formed image.

In this manner, in the present embodiment, the pixel electrode 62a and the common electrode 62b are formed in a region of the pixel region PA other than the light receiving face corresponding region JT which corresponds to the light receiving face JSa of the light receiving element 32. Therefore, in the present embodiment, coupling of the pixel electrode 62a and the common electrode 62b, which applies an electric field to the liquid crystal layer 203, to the light receiving element 32 can be prevented, and consequently, much noise can be prevented from being included in the received light data, and the S/N ratio can be improved. Therefore, precise detection of the position of a detection object body can be implemented readily.

Further, in the present embodiment, when a voltage is applied to the liquid crystal layer 203 in the pixel region PA to carry out image display, no voltage is applied to the liquid crystal layer 203 in the light receiving face corresponding region JT corresponding to the light receiving face JSa of the light receiving element 32. Therefore, the visible rays VR included in the illuminating light R illuminated from the backlight 300 are blocked. Further, where the pixel electrode 62a and the common electrode 62b are formed in the light receiving face corresponding region JT using ITO, since the ITO has a high refraction factor and reflects much of light on an interface thereof, the amount of light to be introduced into the light receiving element 32 decreases. However, in the present embodiment, the pixel electrode 62a and the common electrode 62b are formed in the light receiving face corresponding region JT. Therefore, the amount of light to be introduced into the light receiving element 32 does not decrease.

Further, in the present embodiment, the visible ray cut filter layer 21S is provided in the pixel region PA such that it transmits the infrared rays IR more than the visible rays VR therethrough. Here, in the sensor region RA, the visible ray cut filter layer 21S is provided in such a manner as to cover the second region A2 which is greater than the first region A1 in which the pixel electrode 62b is not formed. Therefore, in the present embodiment, leak light in the sensor region RA can be prevented, and therefore, the image quality can be improved.

Embodiment 2

In the following, an embodiment 2 of the present invention is described.

Configuration of the Pixel Region of the Liquid Crystal Panel

Figure 16:
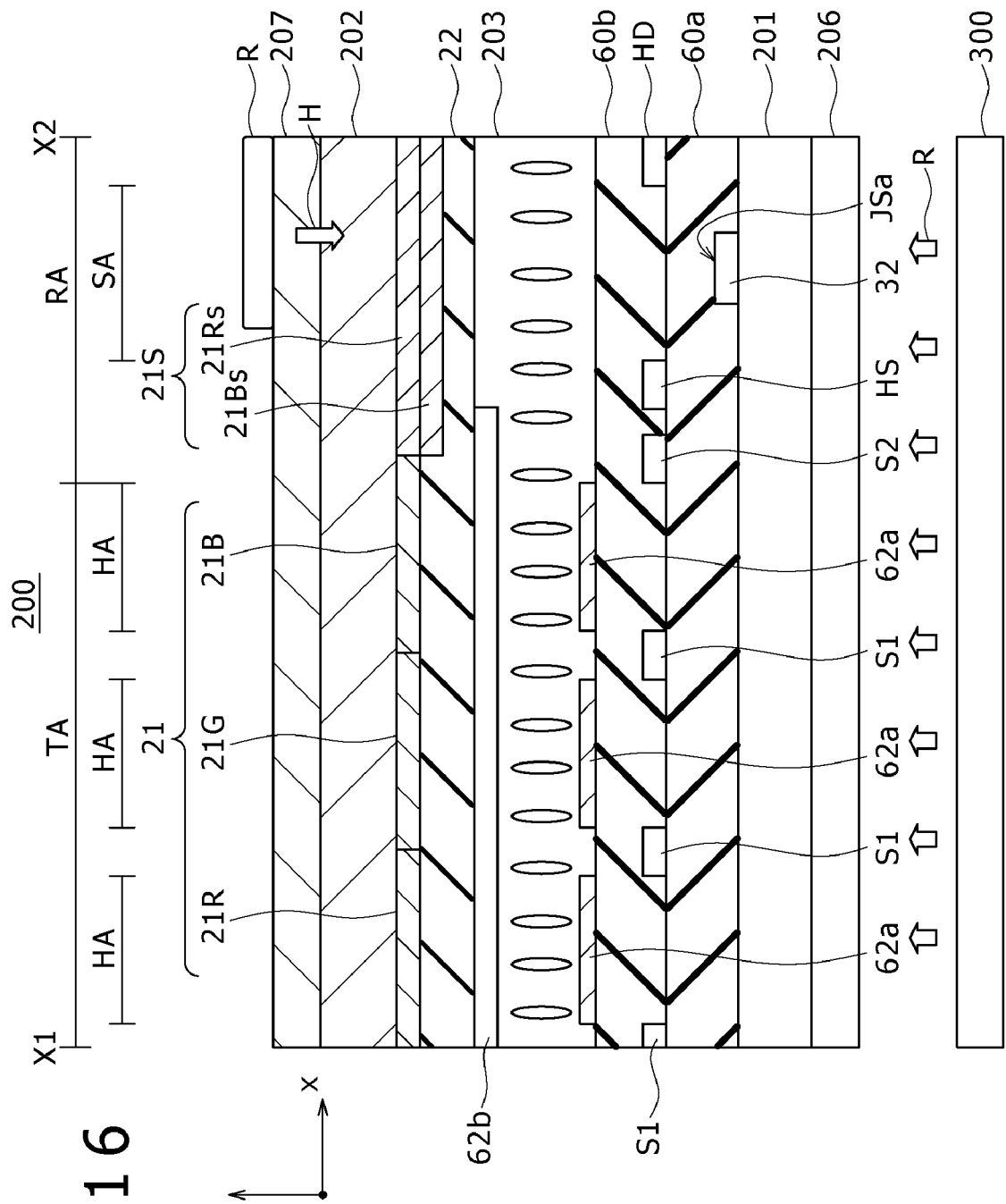
FIG. 16 is a cross sectional view schematically showing part of pixels provided in a pixel region of a liquid crystal panel of a liquid crystal display apparatus according to an embodiment 2 of the present invention.

FIG. 16 is a sectional view schematically showing part of a pixel P provided in a pixel region PA of a liquid crystal panel 200 according to the embodiment 2 of the present invention.

Referring to FIG. 16, the liquid crystal panel 200 in the present embodiment is similar in configuration to that in the embodiment 1 described hereinabove. However, the pixel P in the present embodiment is different from that in the embodiment 1 in the shape of the pixel electrode 62a and the position of the common electrode 62b and in that it does not include the insulating film 60c. Further, in the liquid crystal panel 200 shown in FIG. 16, the liquid crystal layer 203 is oriented such that the longitudinal direction of liquid crystal molecules thereof extends in a direction in which the TFT array substrate 201 and the opposing substrate 202 are opposed to each other. In other words, in the present embodiment, the components are formed such that the display mode corresponds to the vertical orientation mode. Further, the first polarizing plate 206 and the second polarizing plate 207 are disposed in cross Nicol arrangement so as to be ready for the normally black display mode.

The pixel electrode 62a is formed on the face of the TFT array substrate 201 opposing to the opposing substrate 202.

The pixel electrode 62a here is provided on the flattening film 60b formed from an insulating material on the TFT array substrate 201 in such a manner as to cover the lines. The pixel electrode 62a is provided in a corresponding relationship to each of the red filter layer 21R, green filter layer 21G and blue filter layer 21B which compose the color filter layer 21 as seen in FIG. 16. The pixel electrode 62a is a transparent electrode and is formed using, for example, ITO and electrically connected to the drain electrode 54 of the pixel switching element 31. The pixel electrode 62a applies a voltage to the liquid crystal layer 203 interposed between the pixel electrode 62a and the pixel electrode 62b using a potential supplied as an image signal from the pixel switching element 31.

Figure 17:
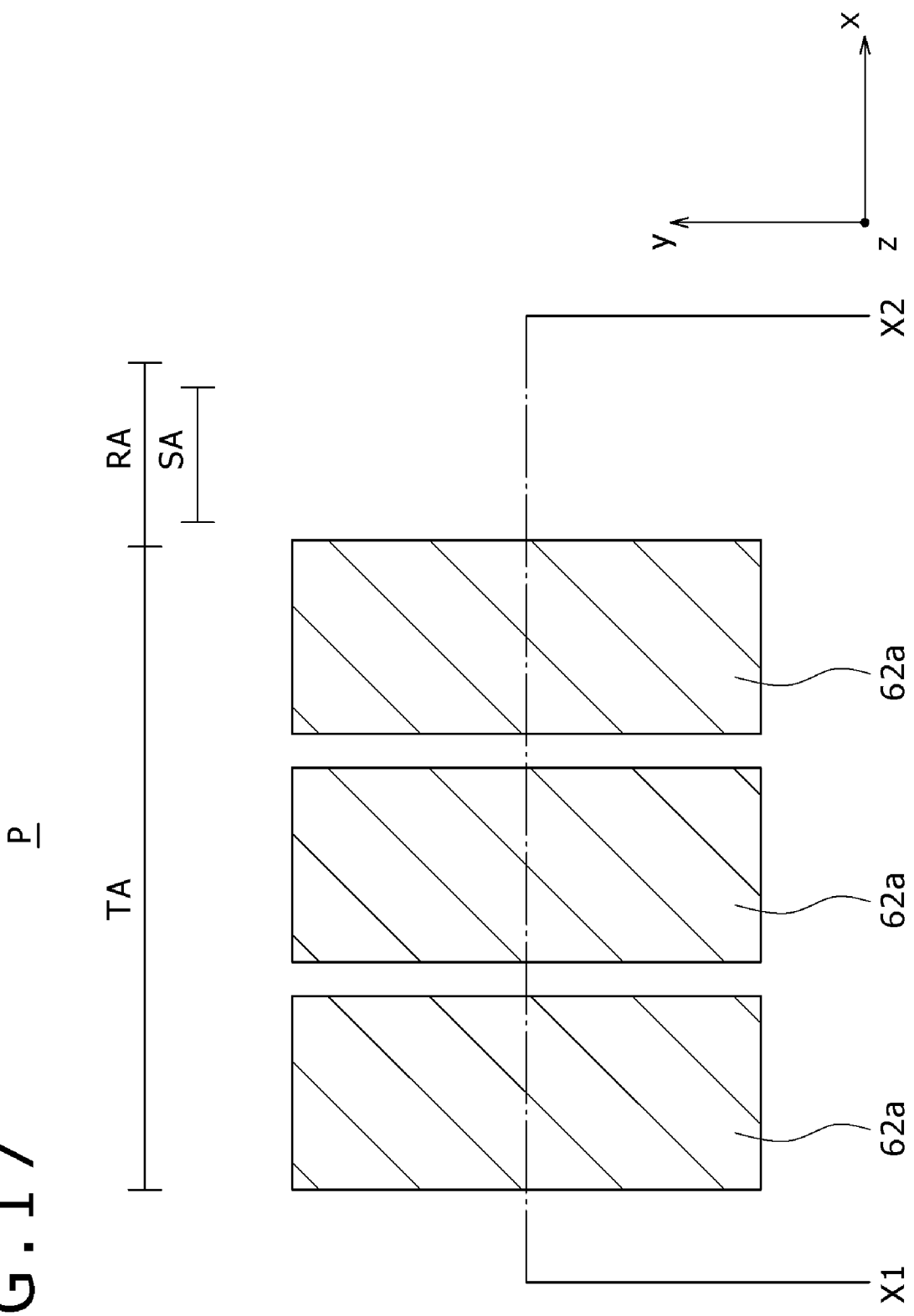
FIG. 17 is a schematic plan view showing pixel electrodes in the liquid crystal panel of FIG. 16.

FIG. 17 is a plan view showing the common electrode 62a in the embodiment 2 of the present invention. Referring to FIG. 17, a cross section taken along line X1-X2 corresponds to FIG. 16.

In the present embodiment, the pixel electrode 62a is formed in a rectangular shape in a direction of the xy plane of the TFT array substrate 201 opposing to the opposing substrate 202 as seen in FIG. 17.

In particular, the pixel electrode 62a is defined by sides extending along the x direction and the y direction, and a plurality of such pixel electrodes 62a are disposed in a juxtaposed relationship with each other and in a spaced relationship from each other in the x direction.

Referring back to FIG. 16, the common electrode 62b is provided adjacent the face of the opposing substrate 202 opposing to the TFT array substrate 201.

Here, the common electrode 62b is provided on a flattening film 22 formed on the opposing substrate 202 in such a manner as to cover the color filter layer 21 and the visible ray cut filter layer 21S. The common electrode 62b is a transparent electrode and is formed, for example, using ITO. The common electrode 62b is opposed through the liquid crystal layer 203 to the pixel electrodes 62a which are provided individually corresponding to the pixels P.

Figure 18:
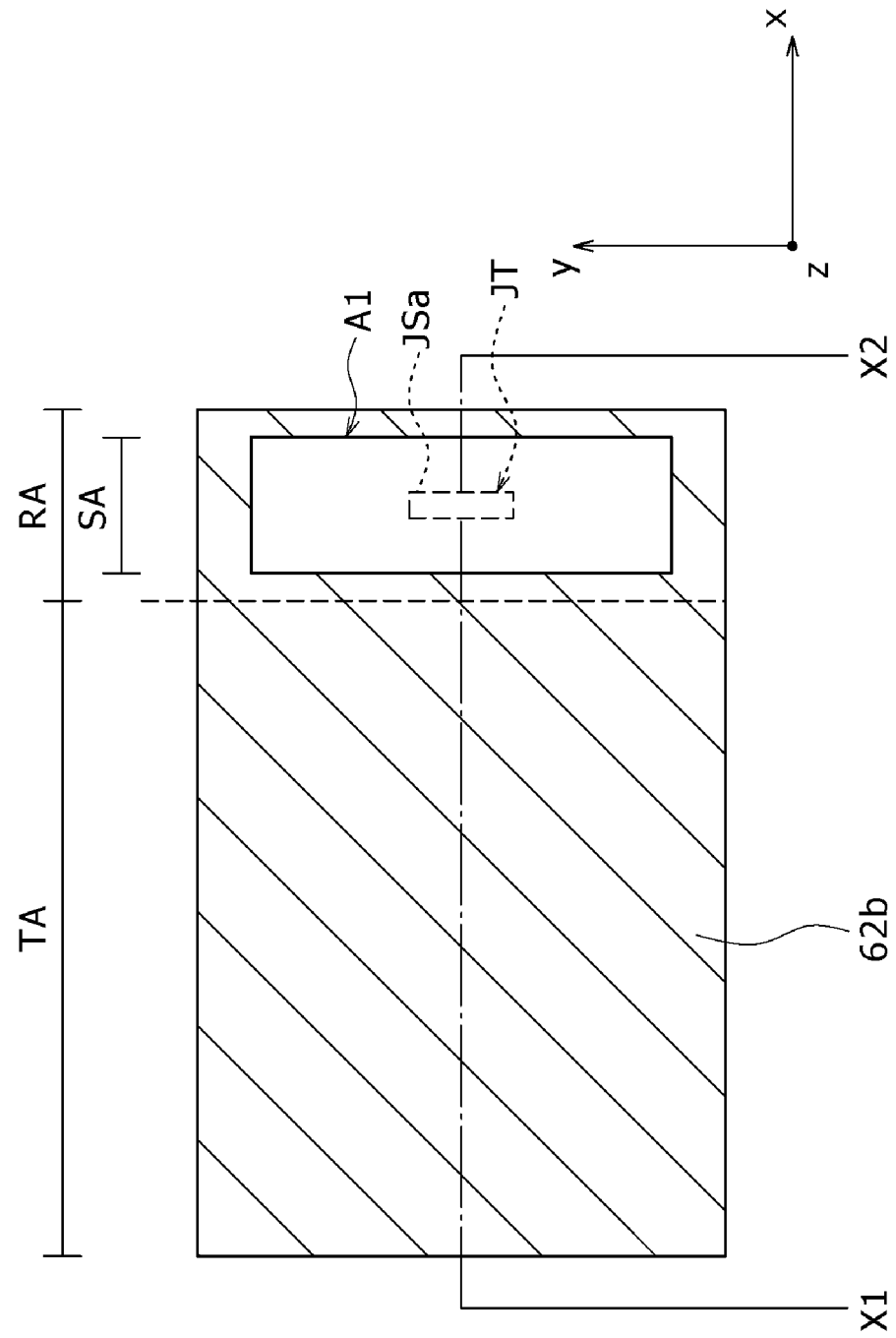
FIG. 18 is a schematic plan view showing a common electrode in the liquid crystal panel of FIG. 16.

FIG. 18 is a plan view showing the common electrode 62b in the embodiment 2 of the present invention. Referring to FIG. 18, a cross section taken along line X1-X2 corresponds to FIG. 16.

Referring to FIG. 18, in the present embodiment, the common electrode 62b is formed in a solid state such that it covers the overall area of the display region TA in the direction of the xy plane of the opposing substrate 202 opposing to the TFT array substrate 201.

Meanwhile, in the sensor region RA, an opening is provided in the first region A1 including the light receiving face corresponding region JT of the common electrode 62b, which corresponds to the light receiving face JSa of the light receiving element 32, in such a manner that it is provided in the region other than the light receiving face corresponding region JT.

In particular, similarly as in the embodiment 1, the first region A1 is defined in a predetermined range from peripheries of the light receiving face corresponding region JT toward peripheries of the sensor region RA between the peripheries of the light receiving face corresponding region JT and the peripheries of the sensor region RA. The opening is provided corresponding to the first region A1. In other words, the common electrode 62b is not formed in the first region A1 in the pixel region PA but is formed in the region of the pixel region PA other than the first region A1.

Operation

In the following, operation of the liquid crystal display apparatus 100 described hereinabove for detecting, when a finger of the human body as the detection object body F is brought into contact with or positioned in the proximity of the pixel region PA of the liquid crystal panel 200, the position of the detection object body F based on received light data obtained regarding the detection object body F.

Figure 19:
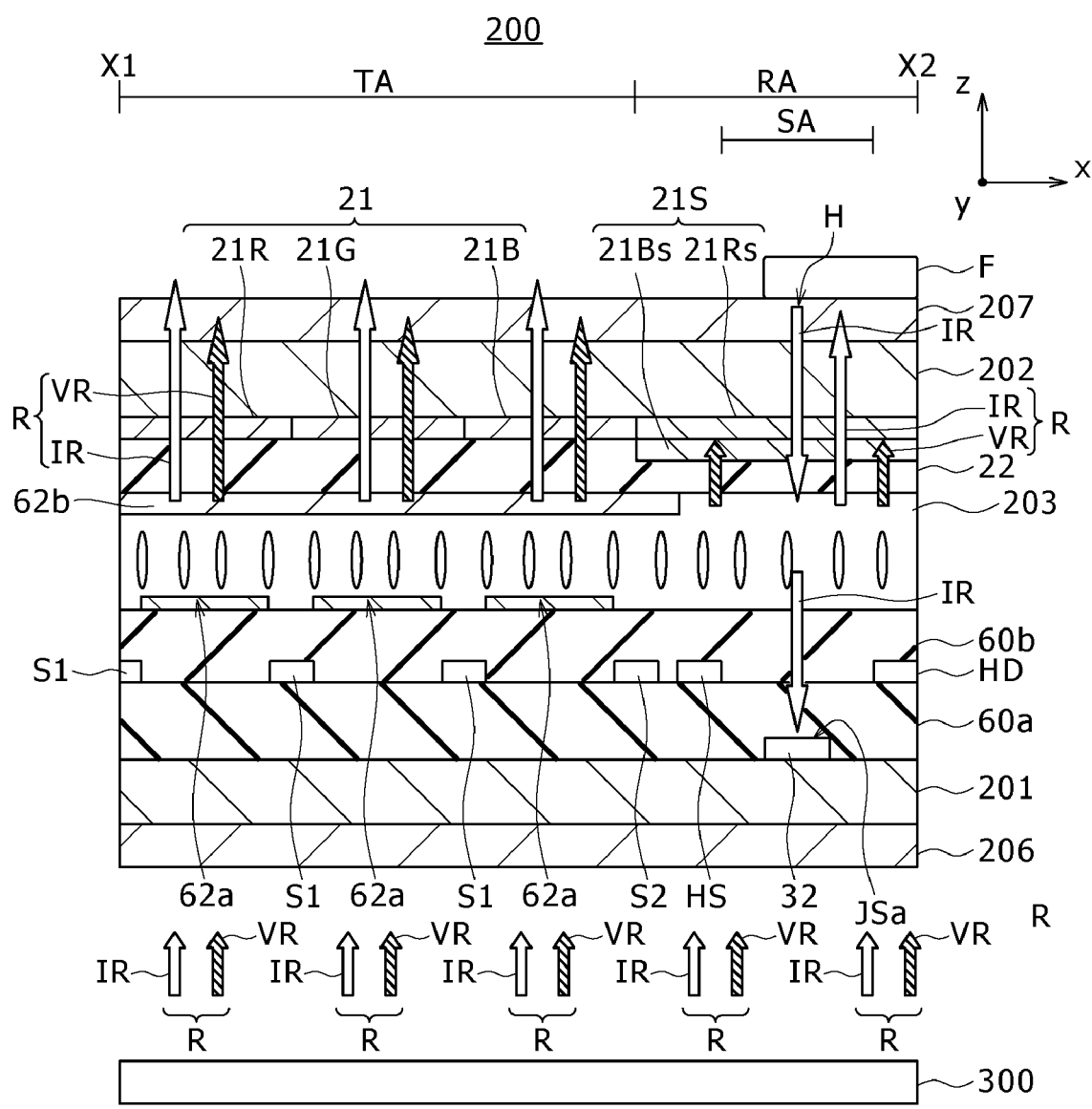
FIGS. 19 and 20 are cross sectional views schematically illustrating different manners in which, when a finger of the human body as a detection object body is brought into contact with or positioned in the proximity of the pixel region of the liquid crystal panel of FIG. 16, the position of the detection object body is detected based on received light data obtained from the detection object body.
Figure 20:
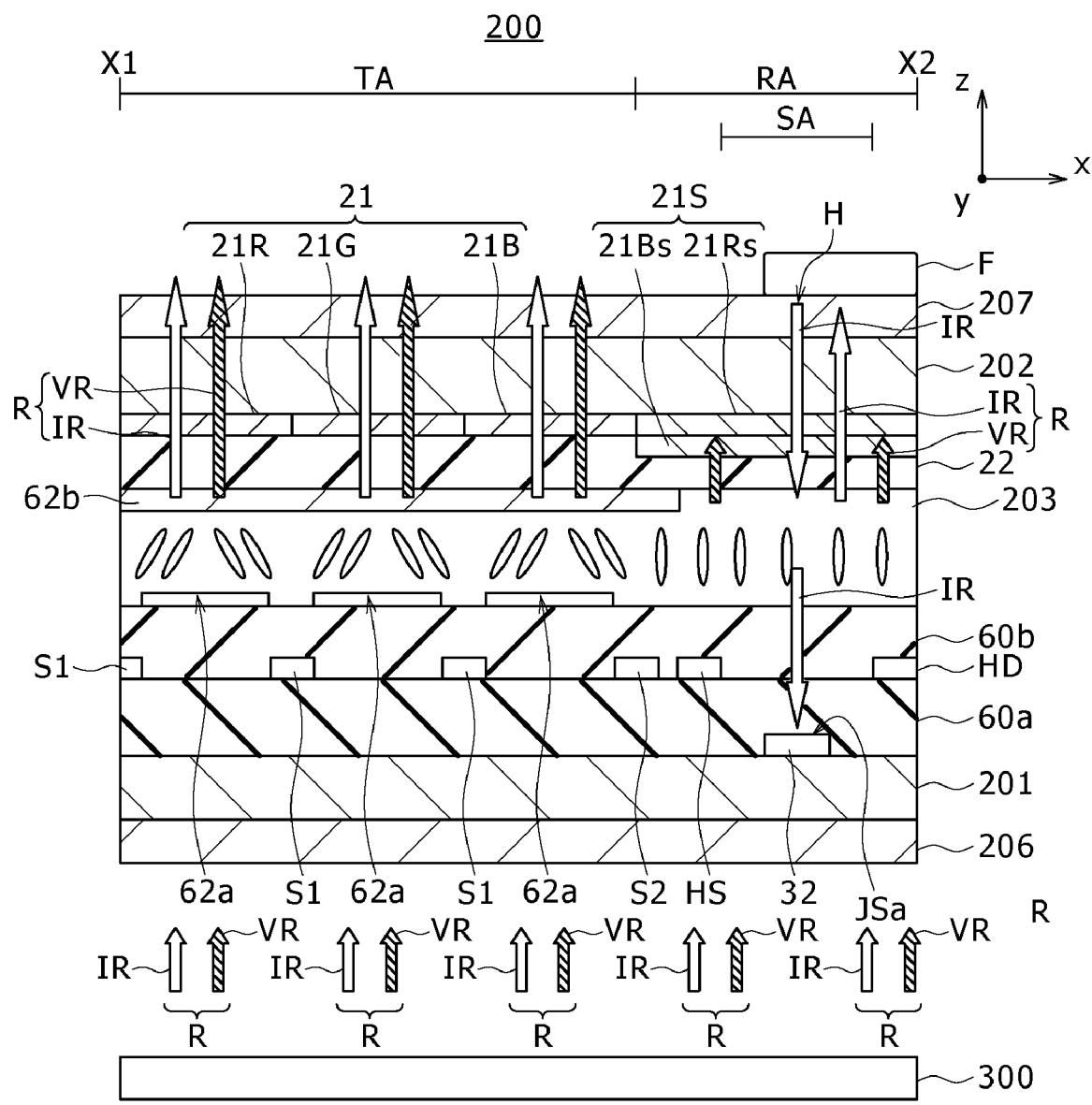

FIGS. 19 and 20 are sectional views schematically showing different manners in the embodiment 2 of the present invention wherein, when a finger of the human body as the detection object body F is brought into contact with or positioned in the proximity of the pixel region PA of the liquid crystal panel 200, the position of the detection object body F is detected based on received light data obtained regarding the detection object body F. In particular, FIG. 19 illustrates the operation when the application of a voltage to the liquid crystal layer 203 is in an off state, and FIG. 20 illustrates the operation when the application of a voltage to the liquid crystal layer 203 is in an on state.

First, the operation when the application of a voltage to the liquid crystal layer 203 is in off state is described.

In this instance, as seen in FIG. 19, in the display region TA of the liquid crystal panel 200, the longitudinal direction of liquid crystal molecules oriented vertically in the liquid crystal layer 203 extend, for example, in the z direction. In the present embodiment, the components are configured such that the normally black display method is used as the display method. Therefore, in the display region TA, visible rays VR included in illuminating light R illuminated from the backlight 300 are not transmitted through but are absorbed by the second polarizing plate 207 to carry out black display.

On the other hand, infrared rays IR included in the illuminating light R illuminated from the backlight 300 are transmitted through the second polarizing plate 207.

In contrast, in the sensor region RA of the liquid crystal panel 200, the visible rays VR included in the illuminating light R illuminated from the backlight 300 are absorbed by the visible ray cut filter layer 21S and are not transmitted through the liquid crystal panel 200.

Meanwhile, the infrared rays IR of the illuminating light R illuminated from the backlight 300 are transmitted through the second polarizing plate 207 in the light receiving region SA as seen in FIG. 19. Therefore, if the detection object body F such as a finger of the human body is brought into contact with or positioned in the proximity of the pixel region PA, then the transmitted infrared rays IR are reflected by the detection object body F as seen in FIG. 19. Then, the reflected light H is received by the light receiving element 32 provided on the liquid crystal panel 200.

Here, the reflected light H directed toward the light receiving face JSa is received and photoelectrically converted by the light receiving face JSa of the light receiving element 32 to produce charge. Then, received light data is read out based on the produced charge by the peripheral circuits.

Then, the position detection section 402 uses the received light data read out from the light receiving element 32 to form an image of the detection object body F positioned in the pixel region PA on the front face side of the liquid crystal panel 200 and detects the position of the detection object body F from the thus formed image.

Now, the operation when the application of a voltage to the liquid crystal layer 203 is in an on state is described.

In this instance, as seen in FIG. 20, the longitudinal direction of liquid crystal molecules oriented vertically in the liquid crystal layer 203 in the display region TA of the liquid crystal panel 200 is inclined to a direction different from the z direction. Therefore, in the display region TA of the liquid crystal panel 200, the visible rays VR included in the illuminating light R illuminated from the backlight 300 are transmitted through the second polarizing plate 207 to carry out white display. Further, also the infrared rays IR of the illuminating light R illuminated from the backlight 300 are transmitted through the second polarizing plate 207.

On the other hand, in the sensor region RA, the visible rays VR included in the illuminating light R illuminated from the backlight 300 are absorbed by the visible ray cut filter layer 21S and are not transmitted through the liquid crystal panel 200.

In particular, in the sensor region RA, the opening is provided in the common electrode 62b in a corresponding relationship to the first region A1 and the pixel electrode 62a is not provided, and therefore, no voltage is applied to the liquid crystal layer 203. Consequently, similarly as in the case wherein the application of a voltage to the liquid crystal layer 203 is in an off state, the visible rays VR included in the illuminating light R illuminated from the backlight 300 are absorbed by the visible ray cut filter layer 21S.

Meanwhile, the infrared rays IR of the illuminating light R illuminated from the backlight 300 are transmitted through the second polarizing plate 207 in the light receiving region SA as seen in FIG. 20 similarly as described hereinabove. Therefore, if the detection object body F such as a finger of the human body is brought into contact with or positioned in the proximity of the pixel region PA of the liquid crystal panel 200, then the transmitted infrared rays IR are reflected by the detection object body F, and the reflected light H is received by the light receiving element 32 provided on the liquid crystal panel 200. Then, the reflected light H directed toward the light receiving face JSa is received by the light receiving face JSa of and photoelectrically converted by the light receiving element 32 to produce received light data. Therefore, the received light data is read out by the peripheral circuits.

Then, the position detection section 402 uses the received light data read out from the light receiving element 32 to form an image of the detection object body F positioned in the pixel region PA on the front face side of the liquid crystal panel 200 and detects the position of the detection object body F from the thus formed image as described hereinabove.

As described above, in the present embodiment, the pixel electrode 62a and the common electrode 62b are formed in the region of the pixel region PA other than the light receiving face corresponding region JT which corresponds to the light receiving face JSa of the light receiving element 32 which composes the photo-sensor element 30b similarly as in the embodiment 1. Therefore, in the present embodiment, the received light data can be prevented from containing much noise therein similarly as in the embodiment 1, and therefore, the S/N ratio can be improved. Consequently, precise detection of the position of a detection object body can be implemented readily. Further, in the present embodiment, the image quality can be improved.

Embodiment 3

In the following, an embodiment 3 according to the present invention is described.

Figure 21:
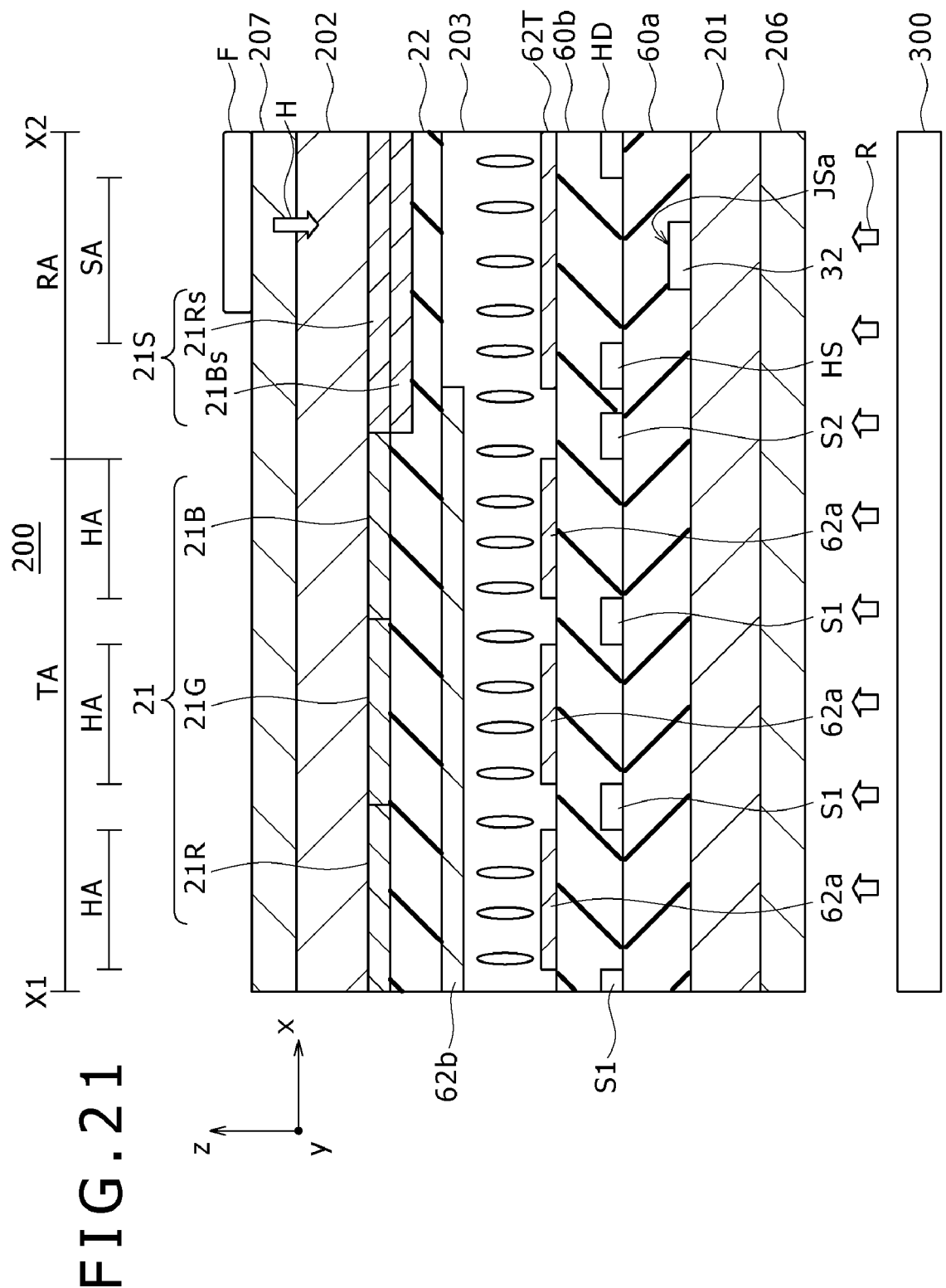
FIG. 21 is a cross sectional view schematically showing part of pixels provided in a pixel region of a liquid crystal panel of a liquid crystal display apparatus according to an embodiment 3 of the present invention.

FIG. 21 is a cross sectional view schematically showing part of a pixel P provided in a pixel region PA of a liquid crystal panel 200 of the present embodiment.

The liquid crystal panel 200 of the present embodiment is similar to but is different from the liquid crystal panel 200 of the embodiment 2 in that the pixel P has a transparent electrode 62T as seen in FIG. 21.

Referring to FIG. 21, the transparent electrode 62T is provided on the flattening film 60b formed so as to cover the lines on the face of the TFT array substrate 201 opposing to the opposing substrate 202 similarly to the pixel electrode 62a.

In the present embodiment, the transparent electrode 62T is formed in the direction of the xy face of the TFT array substrate 201 opposing to the opposing substrate 202. The transparent electrode 62T is formed, for example, using ITO.

Figure 22:
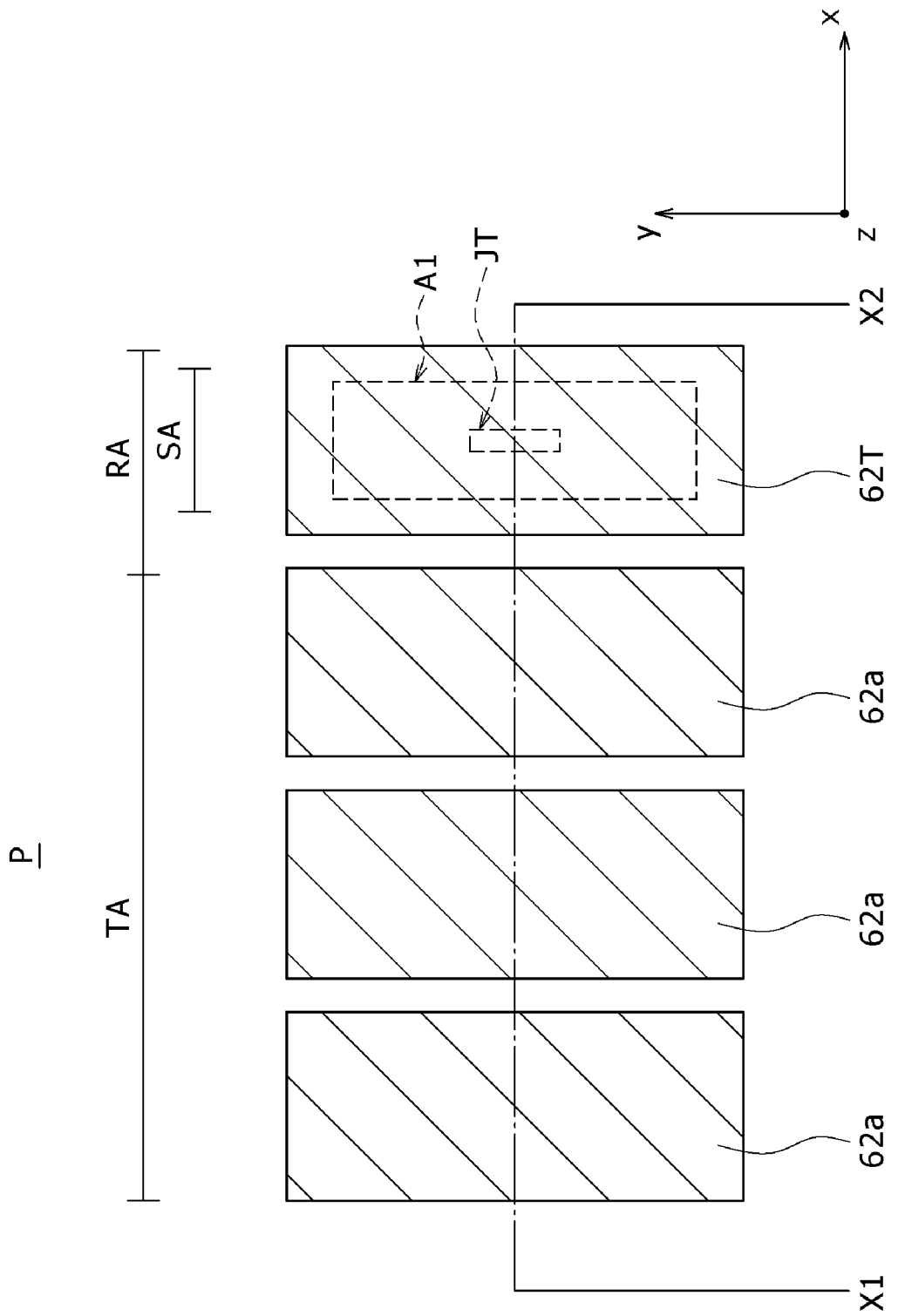
FIG. 22 is a schematic plan view showing pixel electrodes and a transparent electrode in the liquid crystal panel of FIG. 21.

FIG. 22 is a plan view showing the pixel electrode 62a and the transparent electrode 62T in the embodiment 3 of the present invention. Referring to FIG. 22, a cross section taken along line X1-X2 corresponds to FIG. 21.

In the present embodiment, the transparent electrode 62T is formed in a rectangular shape in the direction of the xy face of the TFT array substrate 201 opposing to the opposing substrate 202 as seen in FIG. 22 similarly to the pixel electrode 62a. Here, as seen in FIG. 22, the transparent electrode 62T is juxtaposed in a spaced relationship from the pixel electrodes 62a in the x direction. The transparent electrode 62T is formed in the sensor region RA such that it covers the first region A1 including the light receiving face corresponding region JT corresponding to the light receiving face JSa of the light receiving element 32 which forms the photo-sensor element 30b.

The transparent electrode 62T is preferably configured such that a fixed potential is applied or it is grounded different from the pixel electrode 62a. By the configuration just described, the influence of coupling of the transparent electrode 62T with opposing transparent electrodes of neighboring pixels can be eliminated. Therefore, also when a voltage is applied to the liquid crystal layer 203 in the display region TA to carry out white display, since the liquid crystal layer 203 in the sensor region RA is not influenced by the applied voltage, black display is carried out, and the image quality can be improved.

As described above, in the present embodiment, the transparent electrode 62T is provided in the sensor region RA, different from the embodiment 2. However, the common electrode 62b is formed in the region of the pixel region PA other than the light receiving face corresponding region JT which corresponds to the light receiving region JSa of the light receiving element 32 similarly as in the embodiment 2. Therefore, in the present embodiment, occurrence of leak of light from the sensor region RA can be prevented similarly as in the embodiment 2, and consequently, the image quality can be improved. Further, in the present embodiment, the received light data can be prevented from including much noise, and the S/N ratio can be improved. Therefore, precise detection of the position of a detection object body can be implemented readily.

Embodiment 4

In the following, an embodiment 4 according to the present invention is described.

Figure 23:
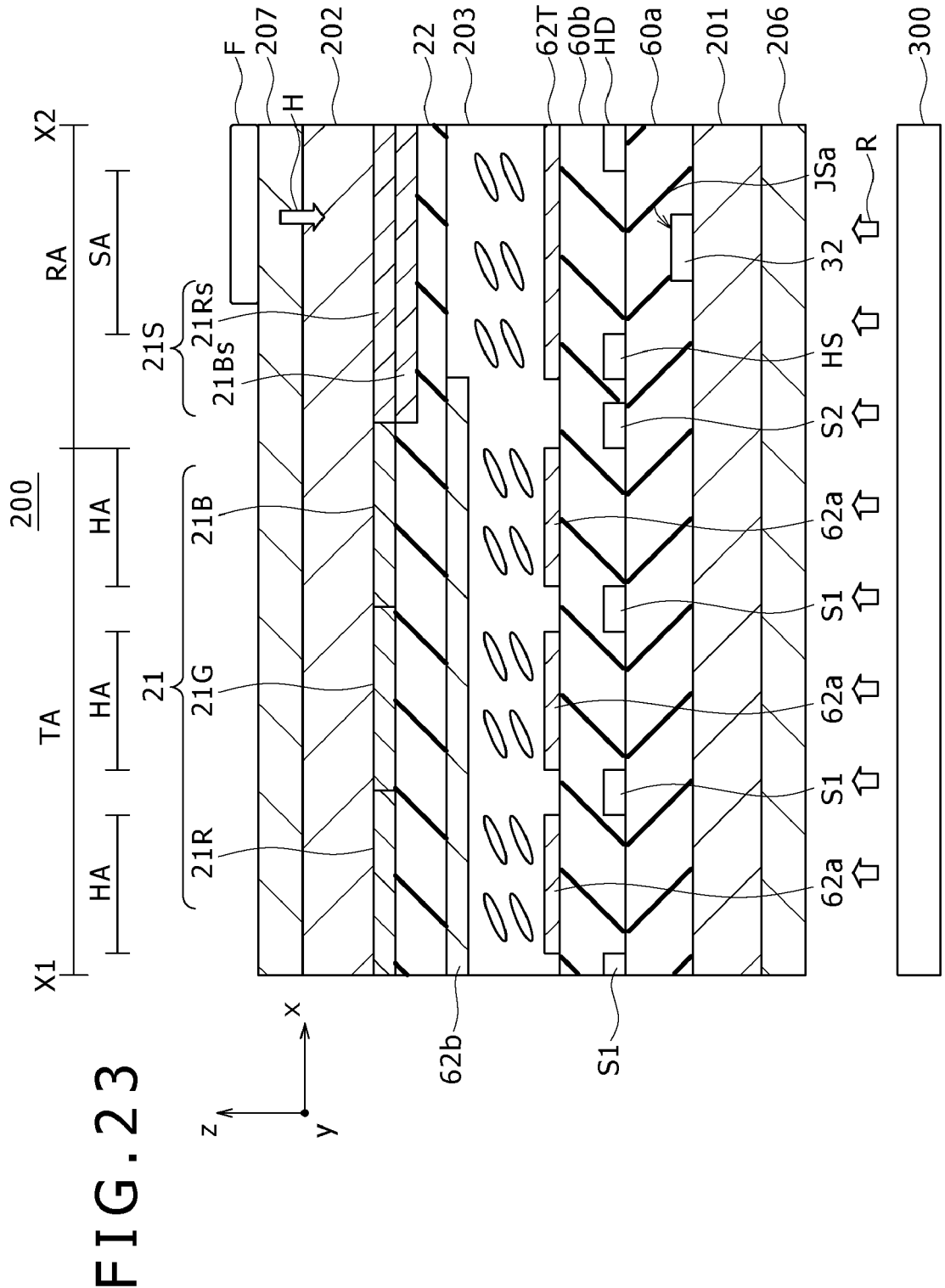
FIG. 23 is a cross sectional view schematically showing part of pixels provided in a pixel region of a liquid crystal panel of a liquid crystal display apparatus according to an embodiment 4 of the present invention.

FIG. 23 is a cross sectional view schematically showing part of a pixel P provided in a pixel region PA of a liquid crystal panel 200.

In the present embodiment, the liquid crystal panel 200 is similar to but different from the liquid crystal panel 200 in the embodiment 3. In particular, the liquid crystal layer 203 is different in the orientation direction from that shown in FIG. 23. Here, the liquid crystal layer 203 is oriented such that liquid crystal molecules are twisted between the TFT array substrate 201 and the opposing substrate 202. In particular, in the present embodiment, the components are formed such that the display mode is ready for the TN (Twisted Nematic) mode. Further, the first polarizing plate 206 and the second polarizing plate 207 are arranged, for example, in the cross Nicol arrangement so as to be ready for the normally white display.

Operation of the liquid crystal display apparatus 100 of the present embodiment for detecting, when a finger of the human body as the detection object body F is brought into contact with or positioned in the proximity of the pixel region PA of the liquid crystal panel 200, the position of the detection object body F based on received light data obtained from the detection object body F.

Figure 24:
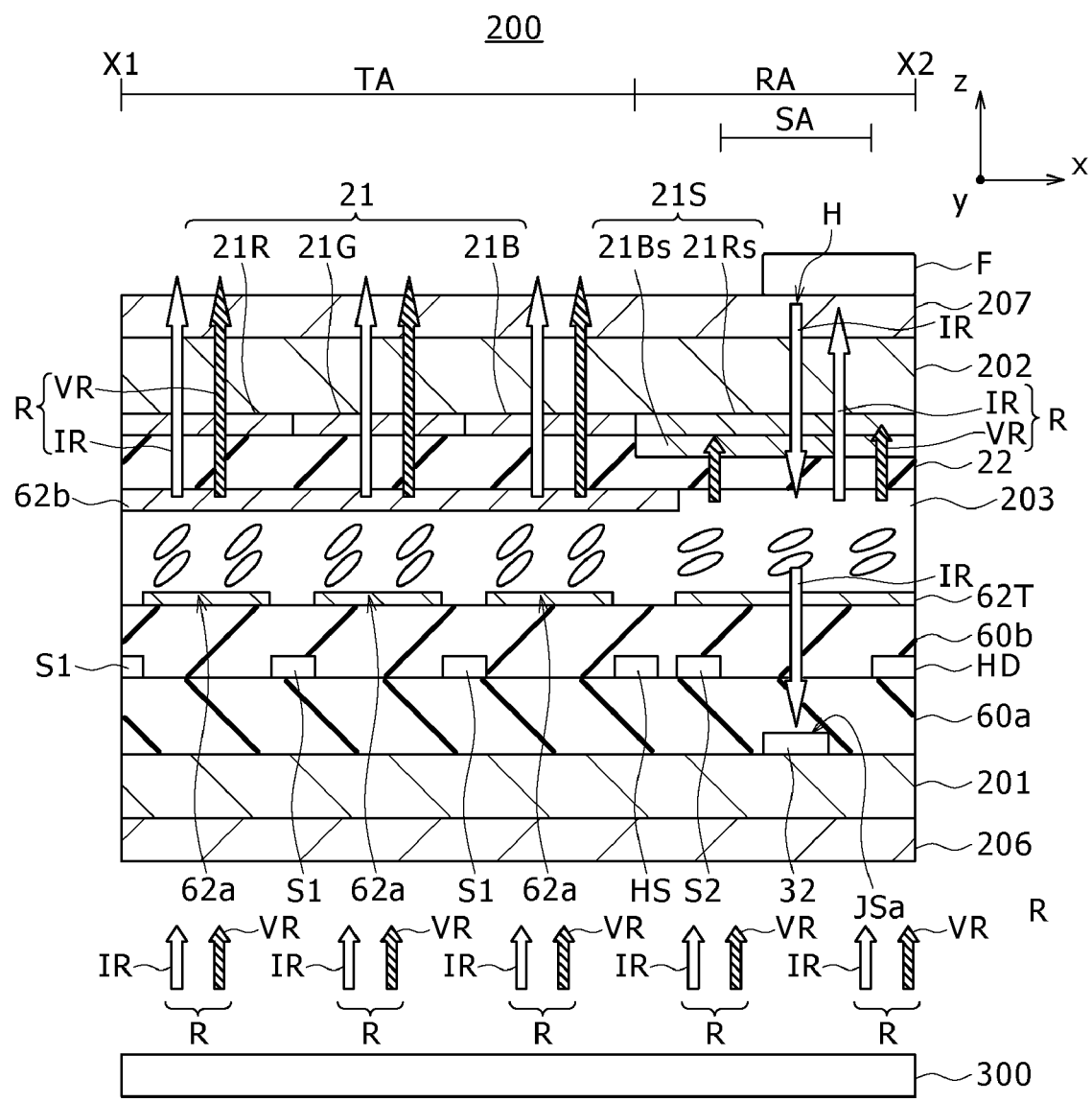
FIGS. 24 and 25 are cross sectional views schematically illustrating different manners in which, when a finger of the human body as a detection object body is brought into contact with or positioned in the proximity of the pixel region of the liquid crystal panel of FIG. 23, the position of the detection object body is detected based on received light data obtained from the detection object body.
Figure 25:
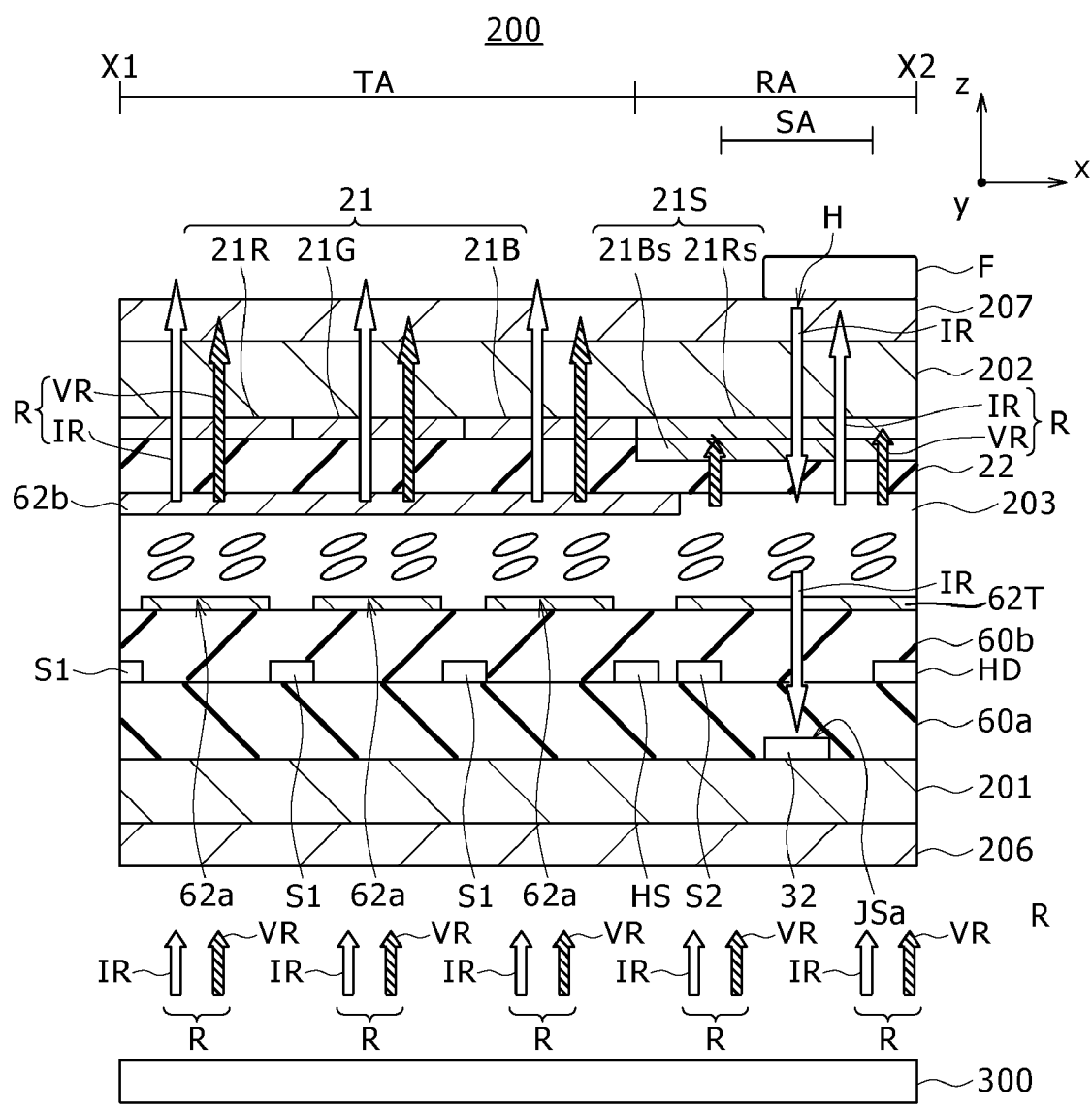

FIGS. 24 and 25 are sectional views schematically showing different manners in the embodiment 4 of the present invention wherein, when a finger of the human body as the detection object body F is brought into contact with or positioned in the proximity of the pixel region PA of the liquid crystal panel 200, the position of the detection object body F is detected based on received light data obtained regarding the detection object body F. In particular, FIG. 24 illustrates the operation when the application of a voltage to the liquid crystal layer 203 is in an off state, and FIG. 25 illustrates the operation when the application of a voltage to the liquid crystal layer 203 is in an on state.

The operation when the application of a voltage to the liquid crystal layer 203 is in off state is described.

In the present embodiment, the components are formed such that a normally white display mode is used. Therefore, when the application of a voltage to the liquid crystal layer 203 is in an off state, in the display region TA, the visible rays VR included in the illuminating light R illuminated from the backlight 300 are transmitted through the second polarizing plate 207 to carry out white display. Also the infrared rays IR included in the illuminating light R illuminated from the backlight 300 are transmitted through the second polarizing plate 207.

However, in the sensor region RA of the liquid crystal panel 200, the visible rays VR in the illuminating light R illuminated from the backlight 300 are blocked by the visible ray cut filter layer 21S and are not transmitted through the liquid crystal panel 200.

On the other hand, the infrared rays IR of the illuminating light R illuminated from the backlight 300 are not blocked but are transmitted through the second polarizing plate 207 in the light receiving region SA as seen in FIG. 24 similarly as described hereinabove. Therefore, if the detection object body F such as a finger of the human body is brought into contact with or positioned in the proximity of the pixel region PA, then the transmitted infrared rays IR are reflected by the detection object body F as seen in FIG. 24, and the reflected light H is received by the light receiving element 32 provided on the liquid crystal panel 200. Then, the reflected light H directed toward the light receiving face JSa is received at the light receiving face JSa of and photoelectrically converted by the light receiving element 32 to produce charge, and received light data of a signal intensity corresponding to the charge is read out by the peripheral circuits.

Then, the position detection section 402 uses the received light data read out from the light receiving element 32 to form an image of the detection object body F positioned in the pixel region PA on the front face side of the liquid crystal panel 200 and detects the position of the detection object body F from the thus formed image as described hereinabove.

Now, the operation when the application of a voltage to the liquid crystal layer 203 is in an on state is described.

In the present embodiment, the components are formed such that a normally white display mode is used. Therefore, when the application of a voltage to the liquid crystal layer 203 is in an on state, in the display region TA of the liquid crystal panel 200, the visible rays VR included in the illuminating light R illuminated from the backlight 300 are not transmitted through the second polarizing plate 207 to carry out black display. Meanwhile, the infrared rays IR included in the illuminating light R illuminated from the backlight 300 are transmitted through the second polarizing plate 207.

On the other hand, in the sensor region RA of the liquid crystal panel 200, the visible rays VR in the illuminating light R illuminated from the backlight 300 are blocked by the visible ray cut filter layer 21S and are not transmitted through the liquid crystal panel 200.

On the other hand, the infrared rays IR of the illuminating light R illuminated from backlight 300 are transmitted through the second polarizing plate 207 in the light receiving region SA as seen in FIG. 25. Therefore, if the detection object body F such as a finger of the human body is brought into contact with or positioned in the proximity of the pixel region PA, then the transmitted infrared rays IR are reflected by the detection object body F as seen in FIG. 25. Then, the reflected light H is received and photoelectrically converted by the light receiving element 32 provided on the liquid crystal panel 200 to produce received light data of a signal intensity corresponding to the received light amount. Thereafter, the received light data is read out by the peripheral circuits. Then, the position detection section 402 uses the received light data read out from the light receiving element 32 to form an image of the detection object body F positioned in the pixel region PA on the front face side of the liquid crystal panel 200 and detects the position of the detection object body F from the thus formed image as described hereinabove.

As described above, while, in the present embodiment, the transparent electrode 62T is provided in the sensor region RA similarly as in the embodiment 3, the common electrode 62$b$ is formed in the region of the pixel region PA other than the light receiving face corresponding region JT corresponding to the light receiving face JSa of the light receiving element 32 which composes the photo-sensor element 30$b$. Therefore, in the present embodiment, since no voltage is applied to the liquid crystal layer 203 in the sensor region RA similarly as in the embodiment 3, leakage of light from the sensor region RA can be prevented, and consequently, the image quality can be improved. Further, in the present embodiment, the received light data can be prevented from including much noise, and the S/N ratio can be improved. Therefore, precise detection of the position of a detection object body can be implemented readily.

It is to be noted that, while, in the present embodiment, the TN mode is used, the advantages described above can be achieved also where the ECB (Electrically Controlled Birefringence) mode is applied.

While several embodiments of the present invention have been described, embodiments of the present invention are not limited to the specific embodiments but can be applied in various forms and modifications.

For example, while the visible ray cut filter layer 21S described above is formed from a laminate of the red filter layer 21Rs and the blue filter layer 21Bs, the configuration of the visible ray cut filter layer 21S is not limited to this. The visible ray cut filter layer 21S can favorably absorb visible rays and selectively transmit infrared rays if it is formed from a laminate of at least two of a red filter layer, a green filter layer, a blue filter layer, a yellowish green filter layer and an emerald green filter layer. It is to be noted that the emerald green filter layer is a color filter formed so as to exhibit a high light transmittance in a wavelength band of 470 to 560 nm. The yellowish green filter layer is a color filter formed so as to have a high light transmittance in another wavelength band of 480 to 560 nm. The red filter layer is a color filter formed so as to have a high light transmittance in a frequency band of 625 to 740 nm. The green filter layer is a color filter formed so as to have a high light transmittance of 500 to 565 nm. The blue filter layer is a color filter formed so as to have a high light transmittance in a wavelength band of 430 to 485 nm.

Figure 26:
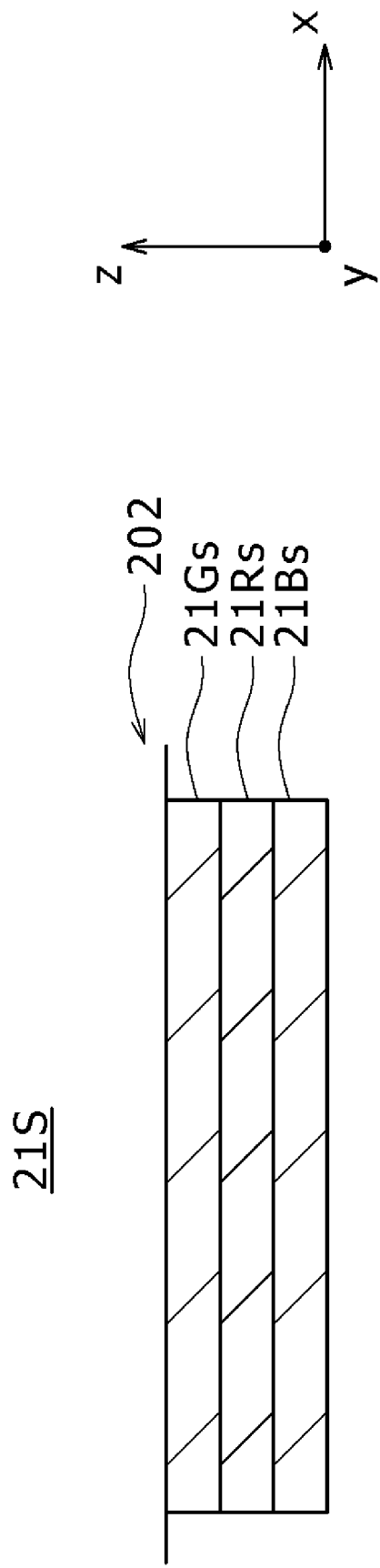
FIG. 26 is a schematic sectional view showing a visible ray cut filter layer which can be used in the liquid crystal display apparatus of FIG. 1.

FIG. 26 is a sectional view showing the visible ray cut filter layer 21S which can be used in the embodiments described hereinabove.

Referring to FIG. 26, the visible ray cut filter layer 21S may be formed from a laminate of filter layers for all of the three primary colors, that is, a red filter layer 21Rs, a green filter layer 21Gs and a blue filter layer 21Bs. Here, the green filter layer 21Gs, red filter layer 21Rs and blue filter layer 21Bs are laminated in order from the opposing substrate 202 side. Each of the green filter layer 21Gs, red filter layer 21Rs and blue filter layer 21Bs is formed using a polyimide resin which contains a coloring agent such as pigment or dyestuff similarly to the color filter layer 21.

Figure 27:
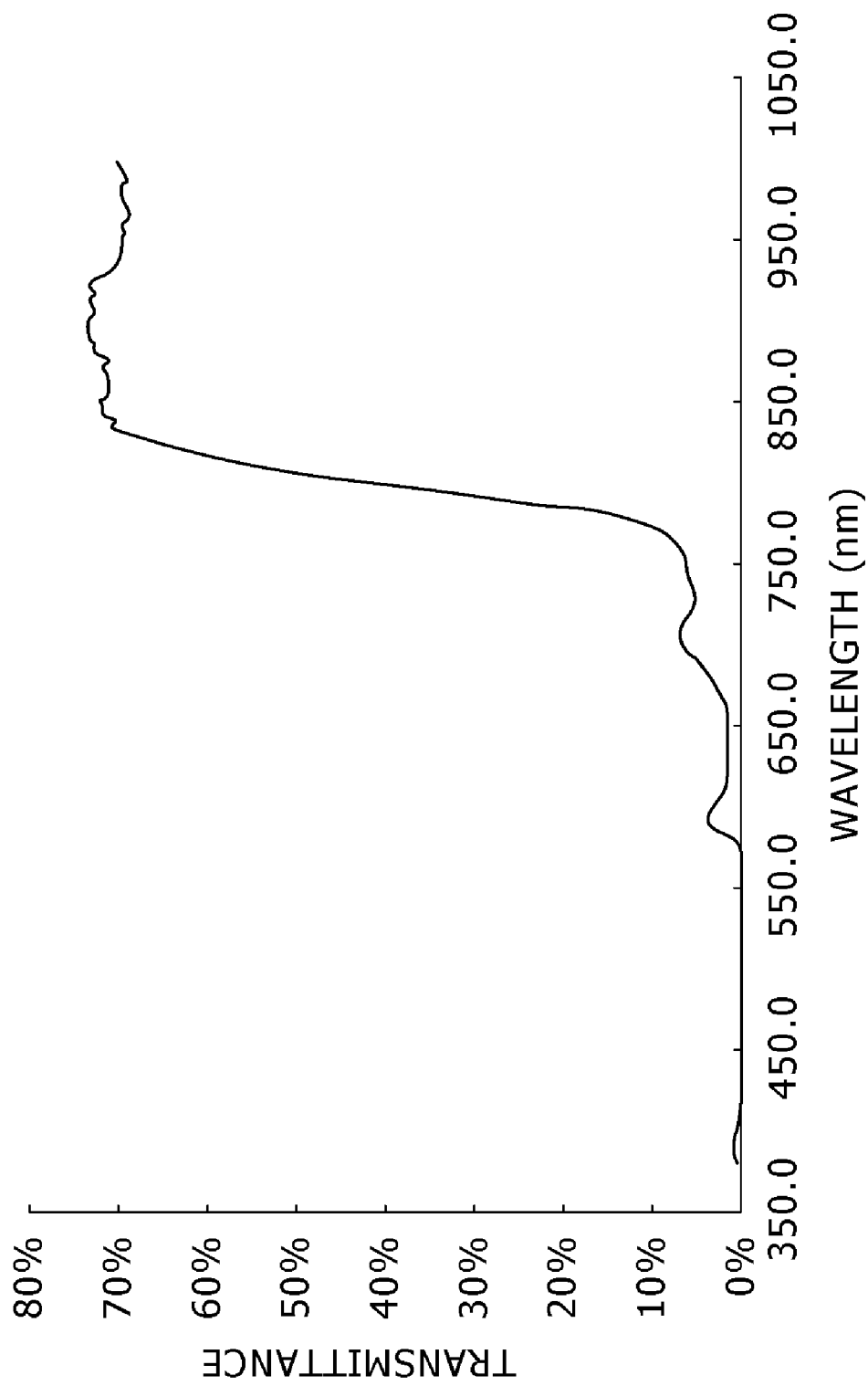
FIG. 27 is a graph illustrating a spectral characteristic of the visible ray cut filter layer of FIG. 26.

FIG. 27 illustrates a spectral characteristic of the visible ray cut filter layer 21S configured in such a manner as described above with reference to FIG. 26. In FIG. 27, the axis of abscissa indicates the wavelength (nm) of incident light, and the axis of ordinate indicates the transmittance (%) of incident light.

The visible ray cut filter layer 21S is a color film laminate including the green filter layer 21Gs, red filter layer 21Rs and blue filter layer 21Bs as described hereinabove. Here, the visible ray cut filter layer 21S is configured such that the green filter layer 21Gs transmits therethrough a greater amount of light in a wavelength region corresponding to the green from among visible rays than that of light in the other wavelength regions. Meanwhile, the red filter layer 21Rs transmits therethrough a greater amount of light in a wavelength region corresponding to the red from among visible rays than that of light in the other wavelength regions. Further, the blue filter layer 21Bs transmits therethrough a greater amount of light in a wavelength region corresponding to the blue from among visible rays than that of light in the other wavelength regions. Therefore, the visible ray cut filter layer 21S is formed such that the light transmittance in the wavelength region corresponding to infrared rays is higher than the light transmittance in the wavelength region corresponding to the visible rays. In particular, the visible ray cut filter layer 21S is configured such that, for example, as regards infrared rays having a center frequency of 850 mm, the visible ray cut filter layer 21S has a light transmittance of approximately 70% as seen in FIG. 27, and as regards the visible rays, the light transmittance is equal to or lower than approximately 30%.

The visible ray cut filter layer 21S is formed at a step same as the step at which the red filter layer 21R and the blue filter layer 21B which compose the color filter layer 21 are formed. For example, coating liquid containing a coloring pigment of the green and a photo-resist material is coated by a coating method such as spin coating to form a coating film. Thereafter, a lithography technique is used to carry out patterning of the coating film to form the green filter layer 21G of the color filter layer 21 and the green filter layer 21Gs of the visible ray cut filter layer 21S. Then, coating liquid containing a coloring pigment for the red and a photo-resist material is coated by a coating method such as spin coating to form a coating film as described hereinabove in connection with the embodiment 1. Thereafter, a lithography technique is used to carry out patterning of the coating film to form the red filter layer 21R of the color filter layer 21 and the red filter layer 21Rs of the visible ray cut filter layer 21S. Then, coating liquid containing a coloring pigment for the blue and a photo-resist material is coated by a coating method such as spin coating to form a coating film. Thereafter, a lithography technique is used to carry out patterning of the coating film to form the blue filter layer 21B of the color filter layer 21 and the blue filter layer 21Bs of the visible ray cut filter layer 21S.

Further, although, in the embodiments described hereinabove, the pixel switching element 31 is formed from a thin film transistor of the bottom gate type, the pixel switching element 31 is not limited to this.

Figure 28:
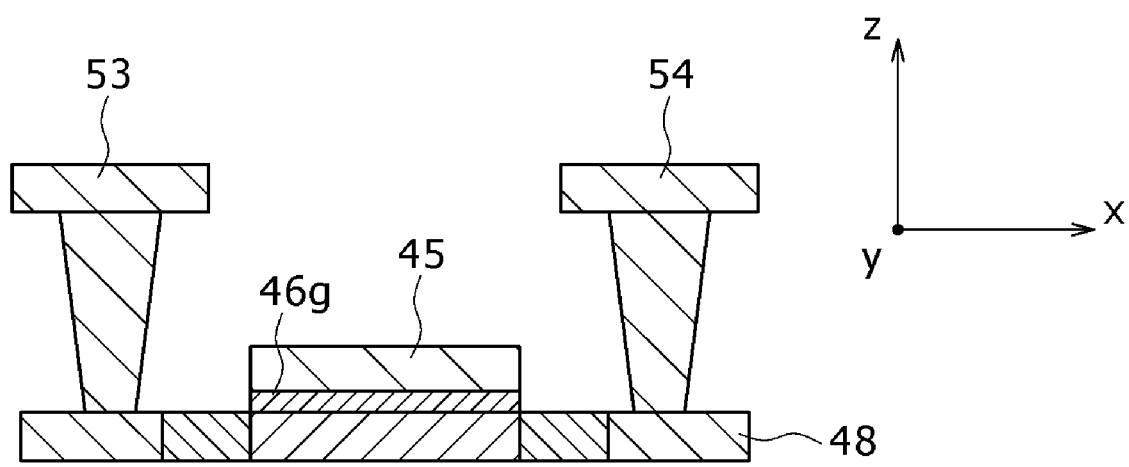
FIG. 28 is a schematic sectional view showing a modified form of the pixel switching element shown in FIG. 7.

FIG. 28 is a sectional view of a modified form of the pixel switching element 31 which can be used in the embodiments described hereinabove.

Referring to FIG. 28, for example, a TFT of the top gate type may be formed as the pixel switching element 31. Further, the light receiving element 32 may be formed so as to have a dual gate structure.

Further, while, in the embodiments described hereinabove, a plurality of light receiving elements 32 are provided in a corresponding relationship to a plurality of pixels P, the relationship between them is not limited to this. For example, one light receiving element 32 may be provided for a plurality of pixels P, or conversely a plurality of light receiving elements 32 may be provided for one pixel P.

Further, the liquid crystal display apparatus 100 according to an embodiment of the present invention can be applied as a part of various electronic apparatus.

FIGS. 29 to 33 show several electronic apparatuses to which the liquid crystal display apparatus 100 according to any one of the embodiments of the present invention described above is applied.

Figure 29:
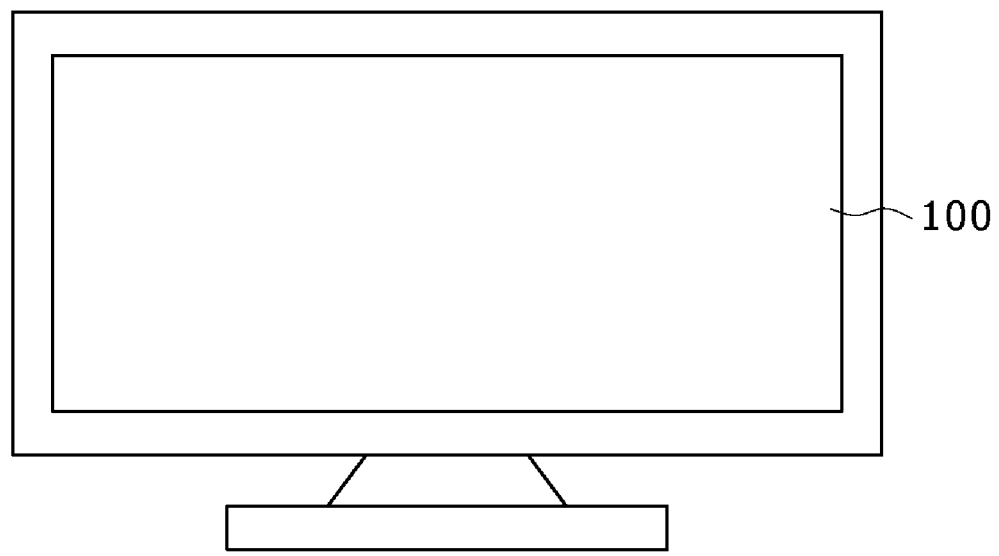
FIGS. 29 to 33 are schematic views showing different electronic apparatus to which the liquid crystal display apparatus of FIG. 1 is applied.

Referring first to FIG. 29, a television set which receives and displays a television broadcast can incorporate the liquid crystal display apparatus 100 as a display apparatus which displays a received image on a display screen and to which an operation instruction of a user is inputted.

Figure 30:
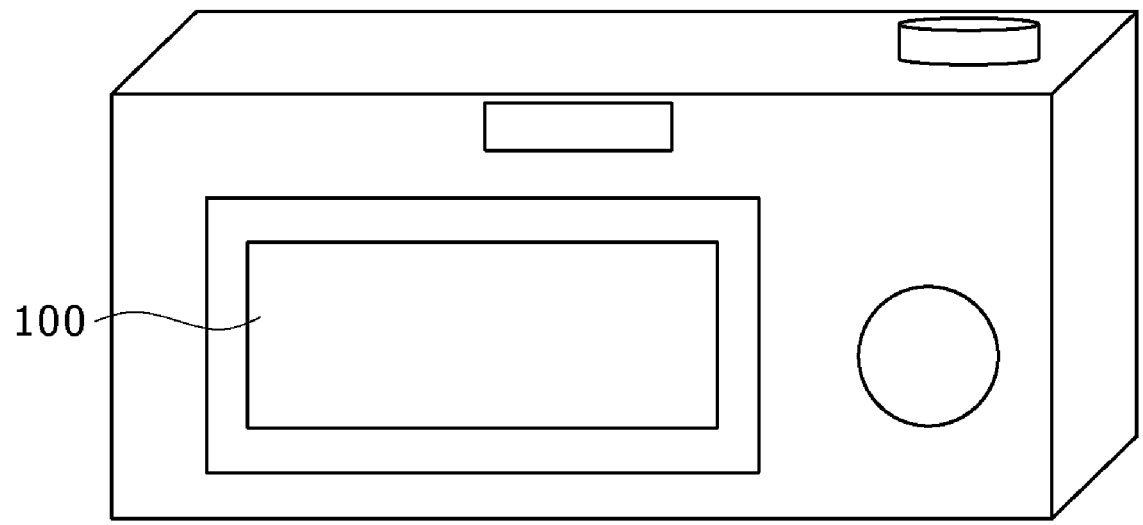

Referring to FIG. 30, a digital still camera can incorporate the liquid crystal display apparatus 100 as a display apparatus which displays an image such as an image picked up by the digital still camera on a display screen thereof and to which an operation instruction of an operator is inputted.

Figure 31:
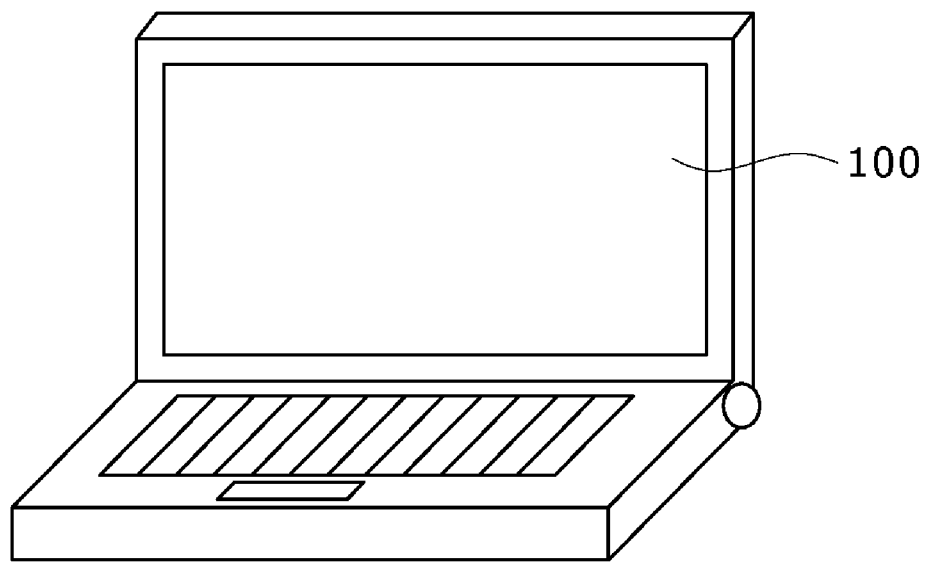

Referring to FIG. 31, a personal computer of the notebook type can incorporate the liquid crystal display apparatus 100 as a display apparatus which displays an operation image or the like on a display screen thereof and to which an operation instruction of an operator is inputted.

Figure 32:
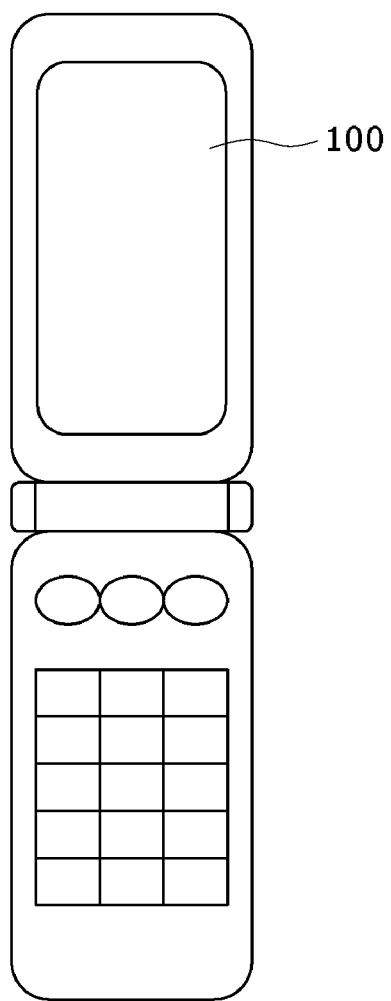

Referring to FIG. 32, a portable telephone set can incorporate the liquid crystal display apparatus 100 as a display apparatus which displays an image such as an operation image on a display screen thereof and to which an operation instruction of an operator is inputted.

Figure 33:
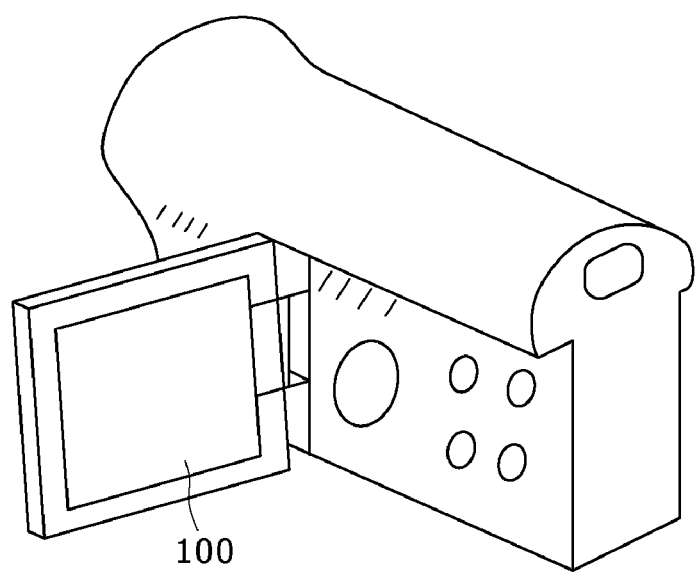

Referring to FIG. 33, a video camera can incorporate the liquid crystal display apparatus 100 as a display apparatus which displays an image such as an operation image on a display screen thereof and to which an operation instruction of an operator is inputted.

Further, while, in the embodiments described hereinabove, the light receiving element 32 includes a photodiode of the PIN type, the light receiving element 32 is not limited to this. Similar advantages can be achieved also where a photodiode of the PDN structure wherein an impurity is doped in the i layer is formed as the light receiving element 32. Further, a phototransistor may be provided as the light receiving element 32.

Further, in the embodiments described above, the red filter layer 21R, green filter layer 21G and blue filter layer 21B are formed in a stripe shape and juxtaposed in the x direction, and the light receiving region SA is formed in the neighborhood of the red filter layer 21R so as to be juxtaposed with the red filter layer 21R, green filter layer 21G and blue filter layer 21B. However, the arrangement of them is not limited to this. For example, a plurality of sets of a red filter layer 21R, a green filter layer 21G, a blue filter layer 21B and a light receiving region SA may be disposed in a matrix of two rows x two columns.

Further, while, in the embodiments described above, illuminating light is illuminated so as to include infrared rays as invisible rays, the invisible rays are not limited to the infrared rays. For example, illuminating light may be illuminated so as to include ultraviolet rays as the invisible rays.

Further, the present invention can be applied to liquid crystal panels of various types such as the IPS (In-Plane-Switchable) type in addition to the display mode described hereinabove.

It is to be noted that, in the embodiments described hereinabove, the liquid crystal display apparatus 100 corresponds to the display apparatus according to an embodiment of the present invention; the liquid crystal panel 200 corresponds to the display panel of the display apparatus according to an embodiment of the invention; the TFT array substrate 201 corresponds to the first substrate of the display apparatus according to an embodiment of the invention; the opposing substrate 202 corresponds to the second substrate of the display apparatus according to an embodiment of the invention; the liquid crystal layer 203 corresponds to the liquid crystal layer of the display apparatus according to an embodiment of the invention; the backlight 300 corresponds to the illuminating section of the display apparatus according to an embodiment of the invention; the position detection section 402 corresponds to the position detection section of the display apparatus according to an embodiment of the invention; the visible ray cut filter layer 21S corresponds to the filter layer of the display apparatus according to an embodiment of the invention; the red filter layer 21Rs corresponds to the red filter layer of the display apparatus according to an embodiment of the invention; the green filter layer 21Gs corresponds to the green filter layer of the display apparatus according to an embodiment of the invention; the blue filter layer 21Bs corresponds to the blue filter layer of the display apparatus according to an embodiment of the invention; the photo-sensor element 30b corresponds to the photo-sensor element of the display apparatus according to an embodiment of the invention; the insulating film 60c corresponds to the insulating film of the display apparatus according to an embodiment of the invention; the pixel electrode 62a corresponds to the first electrode of the display apparatus according to an embodiment of the invention; the common electrode 62b corresponds to the common electrode or the second electrode of the display apparatus according to an embodiment of the invention; the transparent electrode 62T corresponds to the first electrode of the display apparatus according to an embodiment of the invention; the first region A1 corresponds to the first region of the display apparatus according to an embodiment of the invention; the second region A2 corresponds to the second region of the display apparatus according to an embodiment of the invention; the light receiving face JSa corresponds to the light receiving face of the display apparatus according to an embodiment of the invention; the light receiving face corresponding region JT corresponds to the light receiving face corresponding region of the display apparatus according to an embodiment of the invention; the pixel region PA corresponds to the display panel pixel region of the display apparatus according to an embodiment of the invention; and the pixel P corresponds to the pixel of the display apparatus according to an embodiment of the invention.

The present application contains subject matter related to that disclosed in Japanese Priority Patent Application JP 2008-117460 filed in the Japan Patent Office on Apr. 28, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A liquid crystal display apparatus, comprising:
   a liquid crystal panel having a pixel region in which first and second electrodes apply an electric field to a liquid crystal layer to display an image,
   wherein,
   said liquid crystal panel includes a photo-sensor element having a light receiving face at which said photo-sensor element receives incident light through said liquid crystal layer in the pixel region to produce received light data,
   at least one of said first and second electrodes is formed in a region of the pixel region other than a light receiving face corresponding region of the pixel region which corresponds to the light receiving face of said photo-sensor element,
   at least one of said first and second electrodes includes the light receiving face corresponding region and is not formed in a first region greater than the light receiving face corresponding region but formed in any other region than the first region, and
   said liquid crystal panel includes a filter layer provided in the pixel region in such a manner as to transmit therethrough an amount of invisible rays greater than the amount of visible rays from within the light incident to the light receiving face of said photo-sensor element.

2. The liquid crystal display apparatus according to claim 1, wherein said filter layer includes the first region and is disposed so as to cover a second region greater than the first region.

3. The liquid crystal display apparatus according to claim 2, wherein said filter layer is formed so as to transmit therethrough infrared rays as the invisible rays.

4. The liquid crystal display apparatus according to claim 3, wherein said filter layer is a color filter laminate wherein at least two of a red filter layer, a green filter layer, a blue filter layer, a yellowish green filter layer and an emerald green filter layer are laminated.

5. The liquid crystal display apparatus according to claim 4, further comprising:
   a position detection section configured to detect the position of a detection object body positioned adjacent one face of said liquid crystal panel,
   wherein,
   the pixel region includes a plurality of photo-sensor elements disposed therein in such a manner as to receive light advancing from the one face side toward the other face side of said liquid crystal panel, and
   said position detection section is configured to detect the position of the detection object body based on the received light data produced by the plural photo-sensor elements.

6. The liquid crystal display apparatus according to claim 5, further comprising:
   an illuminating section configured to emit illuminating light toward the other face side of said liquid crystal panel,
   wherein,
   said liquid crystal panel being configured such that the illuminating light emitted from said illuminating section is transmitted from the other face side to the one face side of said liquid crystal panel so that an image is displayed in the pixel region using the transmitted light, and
   said photo-sensor element receives reflected light when the illuminating light emitted from said illuminating section and transmitted through said liquid crystal panel is reflected by the detection object body positioned on the one face side of said liquid crystal panel.

7. The liquid crystal display apparatus according to claim 6, wherein said illuminating section emits visible rays and invisible rays as the illuminating light.

8. The liquid crystal display apparatus according to claim 7, wherein:
said liquid crystal panel includes (a) a first substrate positioned on the other face side of said liquid crystal panel and (b) a second substrate positioned on the one face side of said liquid crystal panel and disposed in a spaced relationship from and in an opposing relationship to said first substrate in such a manner as to cooperate with said first substrate to sandwich said liquid crystal layer therebetween; and
said filter layer is provided on said second substrate.

9. The liquid crystal display apparatus according to claim 8, wherein:
said liquid crystal layer includes liquid crystal molecules oriented in a horizontal direction along a plane along which said first and second substrates are opposed to each other; and
said first and second electrodes are provided on said first substrate so as to apply a transverse electric field to said liquid crystal layer.

10. The liquid crystal display apparatus according to claim 9, wherein:
said liquid crystal panel is configured such that the pixel region includes a plurality of pixels disposed therein and further includes a plurality of pixel switching elements disposed on said first substrate so as to correspond to the plural pixels in the pixel region for individually driving the plural pixels;
said first electrode is a pixel electrode connected to each of the pixel switching elements and provided in the pixel region so as to correspond to each of the plurality of pixels; and
said second electrode is provided as a common electrode common to the plural first electrodes in the pixel region.

11. The liquid crystal display apparatus according to claim 10, wherein:
said first substrate includes an insulating film interposed between said first and second electrodes;
said second electrode is formed in such a manner as to cover a region of the pixel region other than the first region without being formed in said first region;
said insulating film is formed adjacent said liquid crystal layer with respect to said second electrode; and
said first electrode is formed in a region of the pixel region other than the first region adjacent the liquid crystal layer with respect to said insulating film without being formed in said first region.

12. The liquid crystal display apparatus according to claim 8, wherein said first electrode is provided on said first substrate while said second electrode is provided on said second substrate.

13. The liquid crystal display apparatus according to claim 12, wherein:
said liquid crystal panel is configured such that the pixel region includes a plurality of pixels disposed therein and further includes a plurality of pixel switching elements disposed on said first substrate so as to correspond to the plural pixels in the pixel region for individually driving the plural pixels;
said first electrode is a pixel electrode connected to each of the pixel switching elements and provided in the pixel region so as to correspond to each of the plural electrodes; and
said second electrode is provided as a common electrode common to the plural electrodes in the pixel region.

* * * * *